Nov. 26, 1946.　　　I. B. WHETSTONE　　　2,411,645
CARD FILING OR GROUPING APPARATUS
Filed Sept. 17, 1936　　　11 Sheets-Sheet 1

Inventors:
Irene B. Whetstone:
By Jones, Addington,
Ames & Seibold
Attorneys

Inventor:
Irene B. Whetstone
By Jones, Addington,
Ames & Seibold
Attorneys

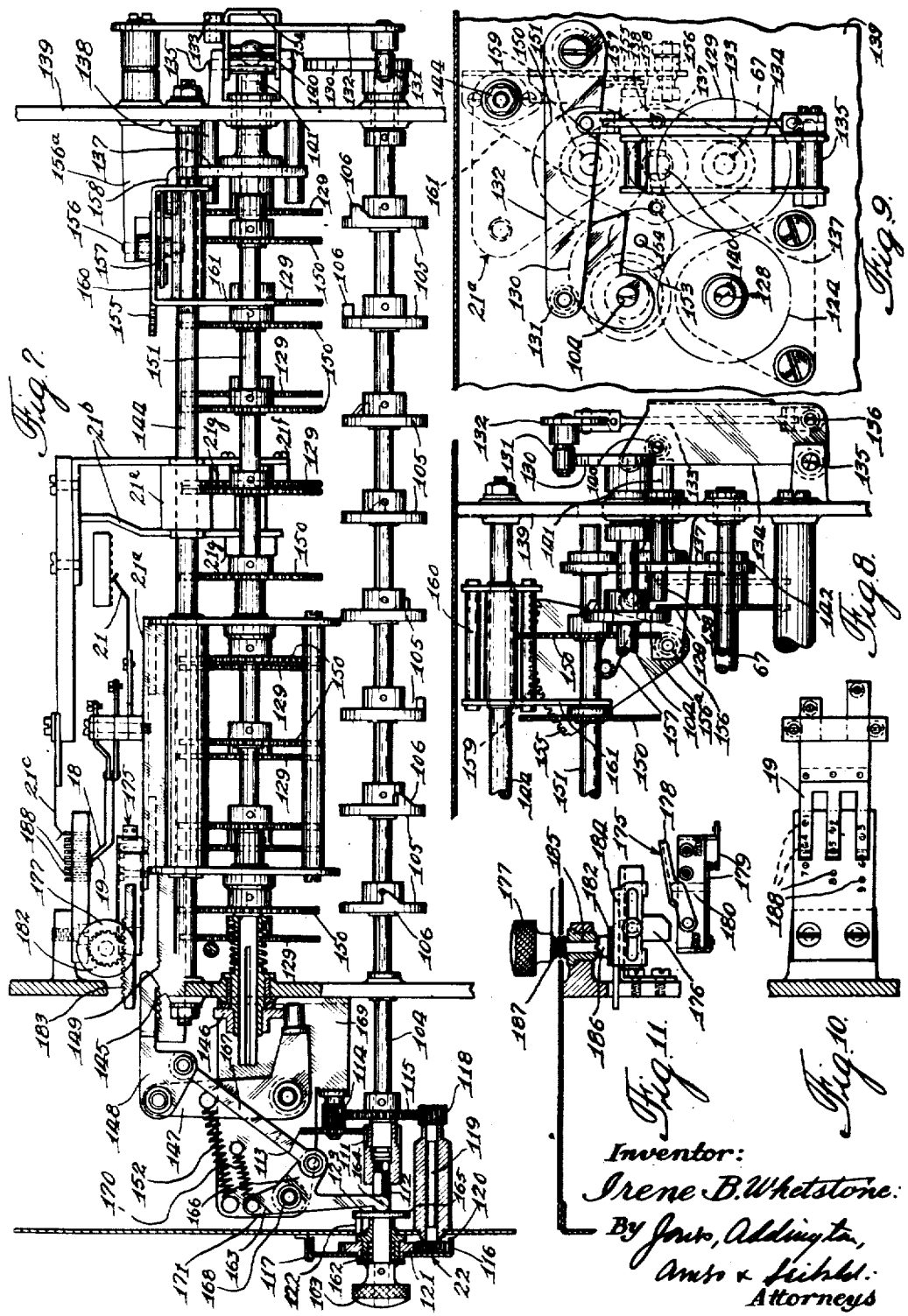

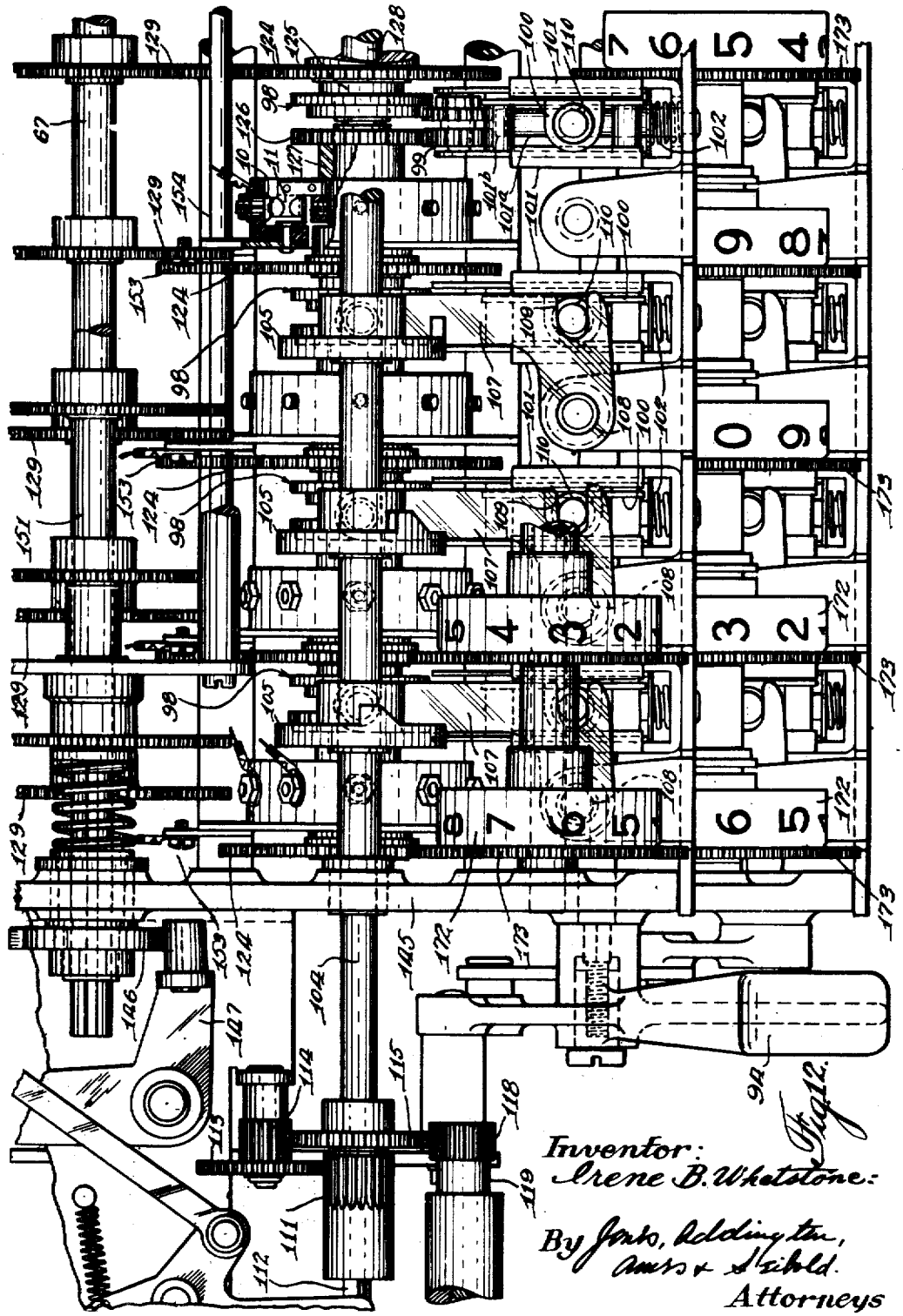

Nov. 26, 1946.  I. B. WHETSTONE  2,411,645
CARD FILING OR GROUPING APPARATUS
Filed Sept. 17, 1936   11 Sheets-Sheet 7
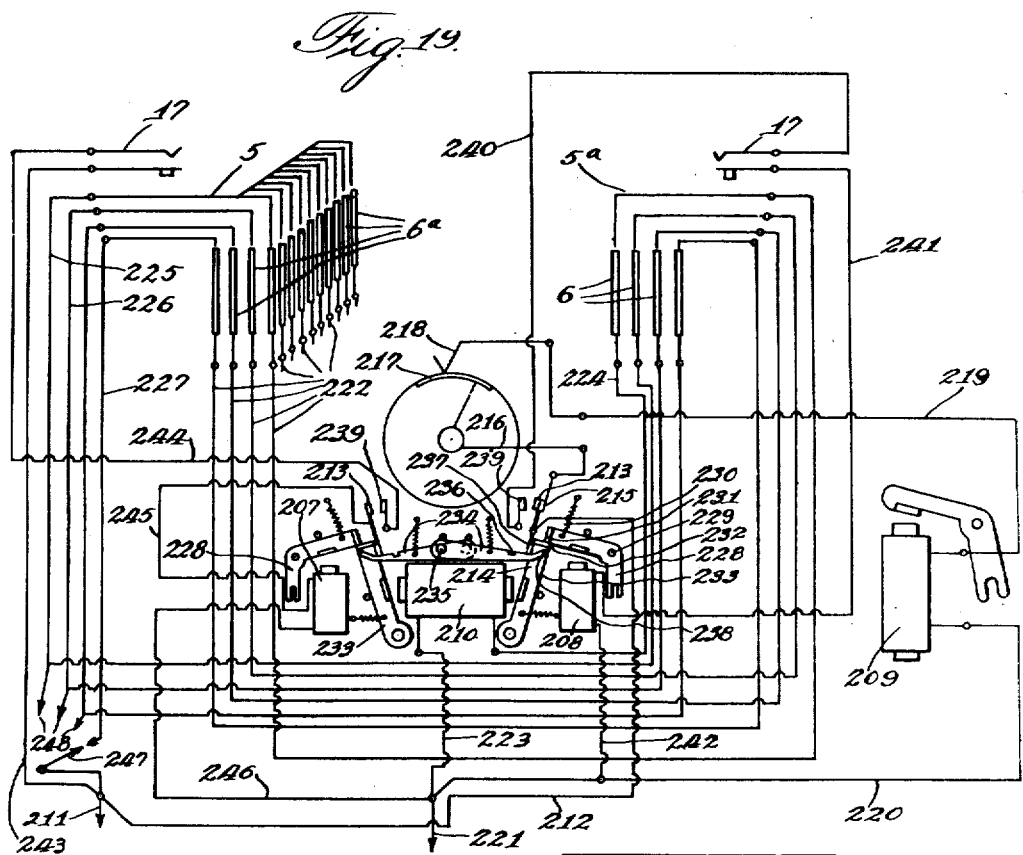
Fig. 19.
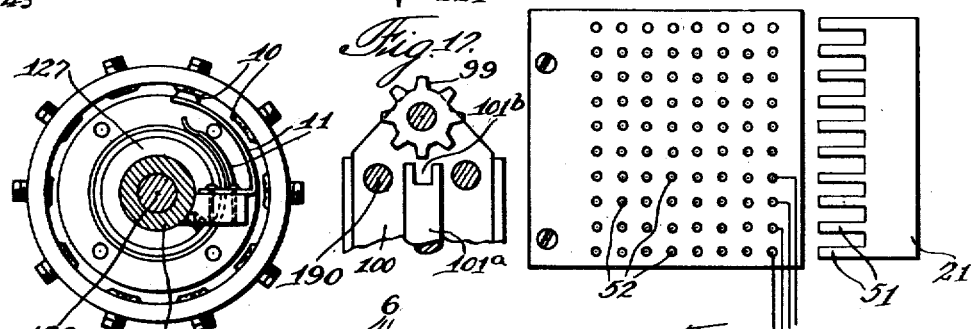
Fig. 17.
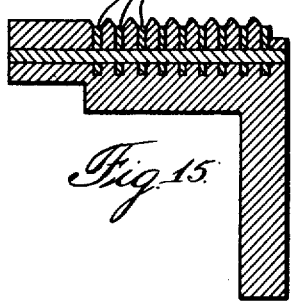
Fig. 16.
Fig. 13.
Fig. 15.
Inventor:
Irene B. Whetstone
By Jnto, Addington, Ambs & Sibble
Attys.

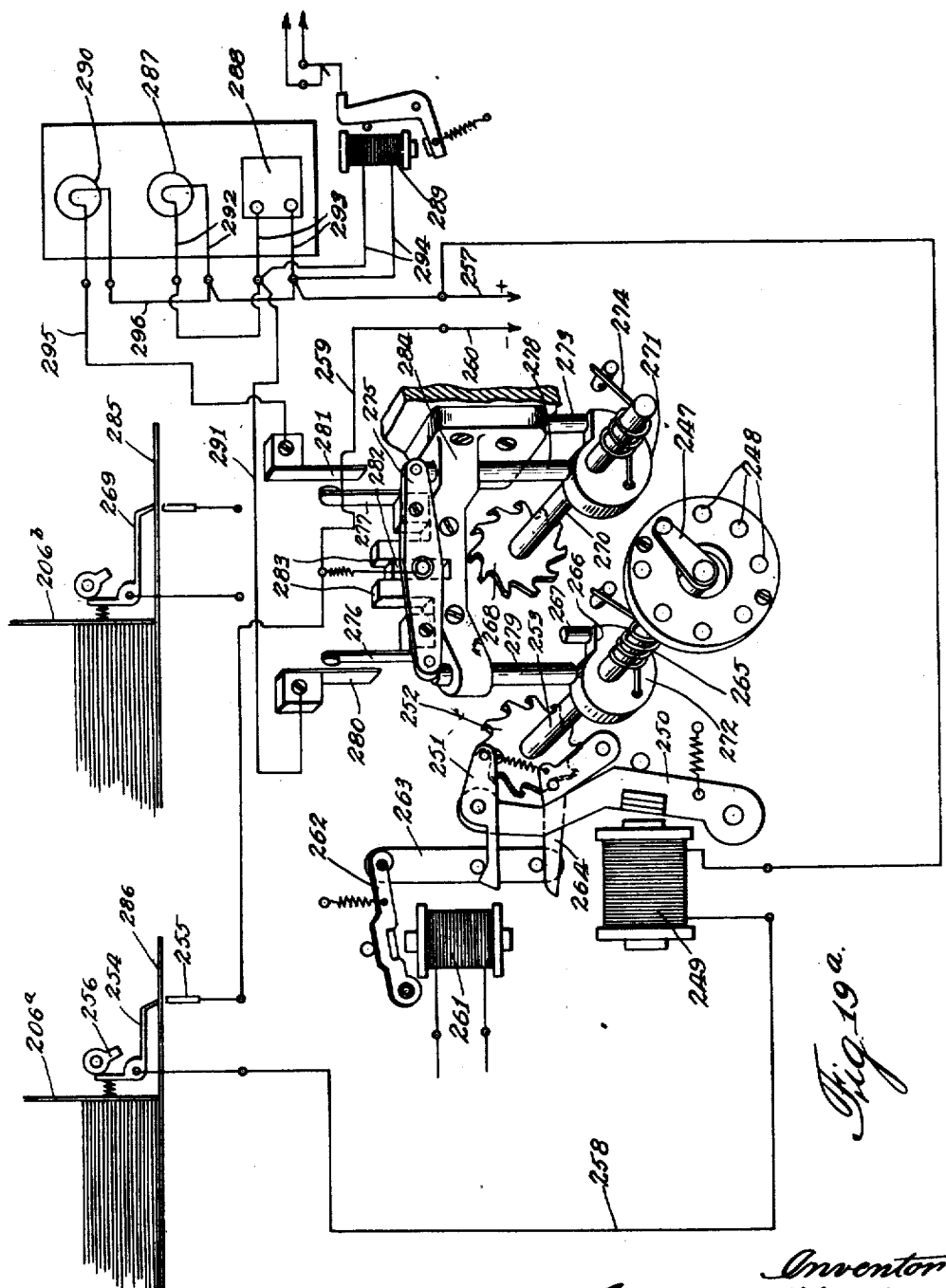

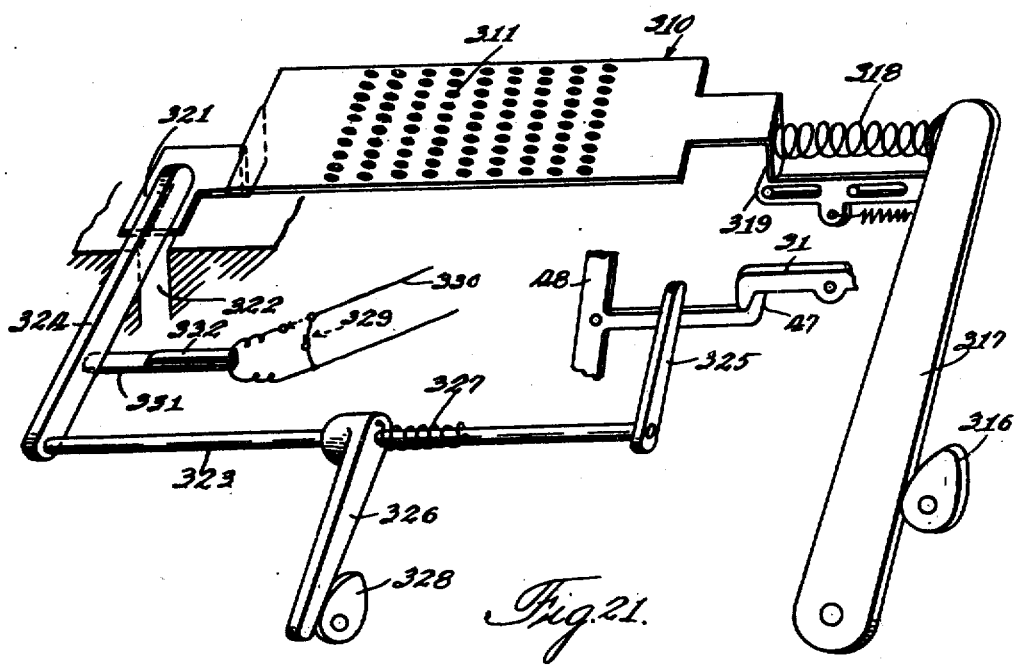
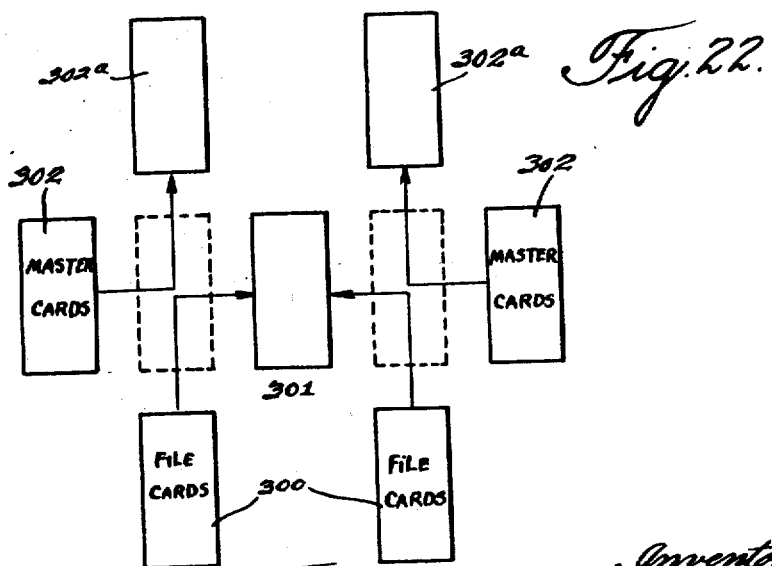

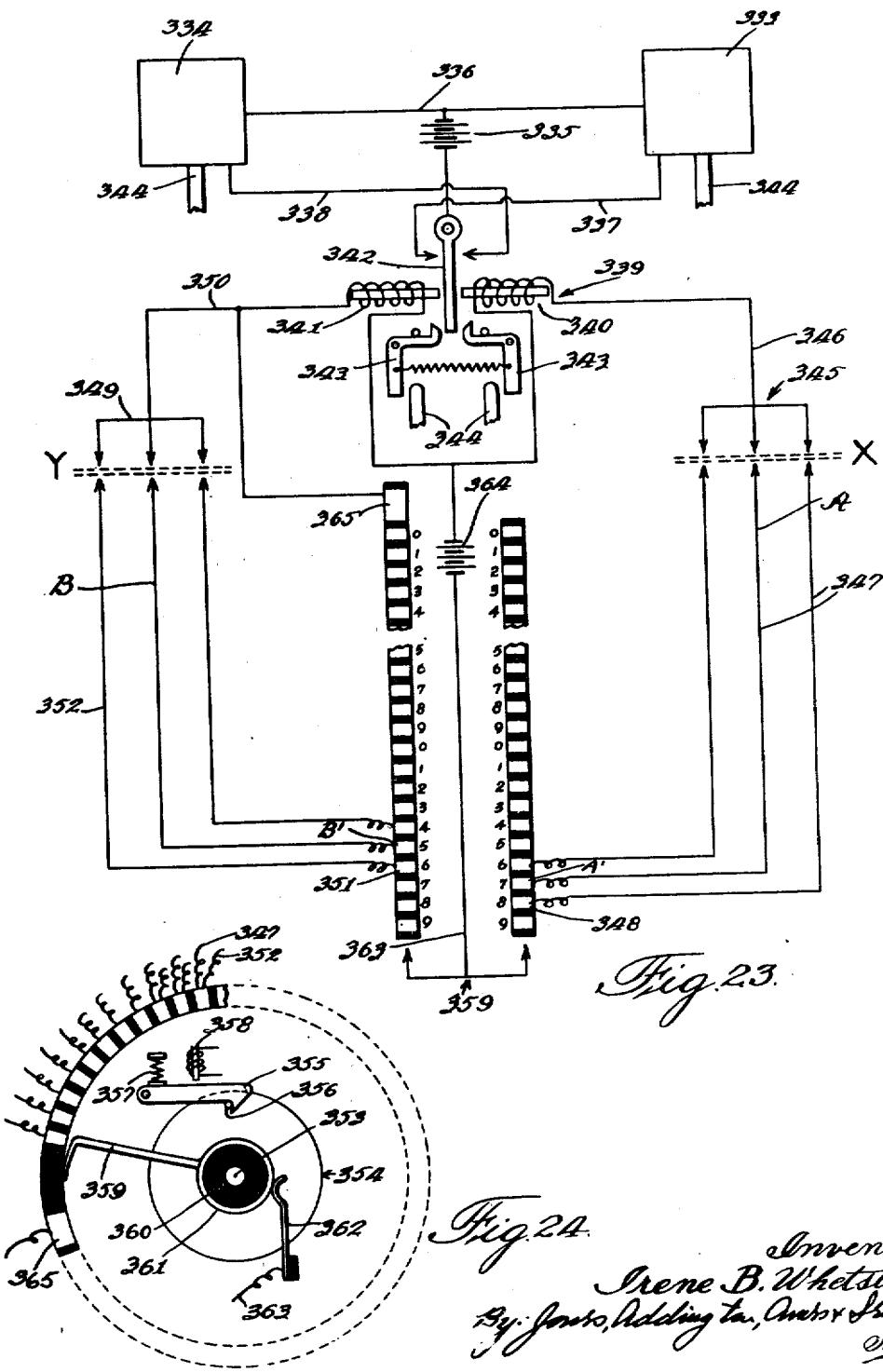

Patented Nov. 26, 1946

2,411,645

UNITED STATES PATENT OFFICE 2,411,645

CARD FILING OR GROUPING APPARATUS

Irene B. Whetstone, Chicago, Ill., assignor to International Business Machines Corporation, a corporation of New York Application September 17, 1936, Serial No. 101,207

48 Claims. (Cl. 209—110)

My invention relates to card filing or grouping apparatus for use with what is commonly known as record-controlled equipment.

One of the objects of my invention is to provide apparatus for grouping or bringing together two or more groups of punched cards, such as are commonly used with tabulating equipment, which groups have previously been brought into numerical or alphabetical sequence, the various groups together forming a complemental sequence, the apparatus serving to group the cards into one common group arranged in consecutive order.

A further object of my invention is to provide improved apparatus for withdrawing from a group of such cards arranged in numerical sequence any desired selection of cards.

A further object of my invention is to provide apparatus for reassembling matched cards, some of which cards have previously been withdrawn from the matched group.

A further object of my invention is to provide apparatus for assembling in a predetermined order control records of like designation occurring in two or more groups.

As previously specified, a primary object of this invention, relating to all the species shown with exception of Fig. 19, is that of filing cards; that is, bringing together two or more groups of cards of correlated sequence to form one group of cards assembled in numerical order. For example:

| Original opposed groups | | Combined group |
|---|---|---|
| Group 1 | Group 2 | |
| *10 | *11 | *10 |
| 14 | *13 | *11 |
| *15 | 14 | *13 |
| 19 | 19 | 14 |
| *22 | *20 | 14 |
| | | *15 |
| | | 19 |
| | | 19 |
| | | *20 |
| | | *22 |

The asterisk indicates those cards in the original opposed groups 1 and 2 which are complemental to the other cards in said groups. When two cards match, there is no difference in values and ejection is made on the basis of agreement, but cards complemental to each other, regardless of which original group they may occur in, are selected on the basis of their respective values. Mechanism and structural detail has been designed in the respective species illustrated, to co-operate in effecting this result. In the claims, this structural detail and co-operative mechanism has been referred to as value differentiating selective means. This means is continuously effective for selectively causing ejection of any one of a plurality of records undergoing comparison, bearing a designation of a predetermined value extreme, i. e., a high or low value as may be predetermined, of any series of designating characters, or any combination of the designating characters of such series.

In the various species shown, this value differentiating selective means is combined with structural detail and mechanism for conveying the cards to a common receptacle and assembling them therein in a common group in correct numerical order. This structural detail and mechanism is sometimes referred to in the claims as correlating means and record handling means.

Heretofore, data comparing machines designed to accomplish certain selective disposition of records undergoing comparison have required that all unused columns in the designating fields of such records be provided with perforations in the zero positions. For example, if the numerical designations to be compared employed a maximum of six ordinal positions in the designating fields of the records, all records employing designations of less than this established maximum would require zero perforations. All records, for example, numbered from 1 to 9 would require five zero perforations prefixing these values. Those numbered from 10 to 99 would require four zero prefixes, etc.

The apparatus described herein requires no such auxiliary perforations. Comparison is made between corresponding ordinal positions in opposed records, and selection is effected as a result of such comparison, independent of the condition of other ordinal columns in the designating fields of records undergoing comparison.

Another advantage of the apparatus described herein over the other machines of similar character is its capacity for handling (i. e, reading, comparing, and selecting) cards perforated in combinational code, such, for example, as is commonly employed for expressing an alphabetical series, as well as in handling cards perforated in straight numerical code in which each digit in a 0 to 9 series is represented by a single perforation.

For the purpose of illustration, the apparatus as shown is designed for use with cards such as are commonly employed with well-known tabulating equipment, in which each card is provided with operating or index point positions representing a numerical or an alphabetical series and certain of these positions are perforated to make operative the specific alphabetical or numerical designations identifying a record. The invention however should not be limited to perforated means for distinguishing a designation, as other means might readily be employed.

The apparatus may be used with cards such as are used in well known tabulating machines in which each card is provided with one or more perforations corresponding to the number of the card.

Further objects and advantages of the invention will be apparent from the description and claims.

In the drawings, in which several embodiments of my invention are shown:

Fig. 7 is a plan view showing the manual control for the selection of the units selector and the shiftable drive for the contact shifting slide;

Fig. 8 is an elevational view of the right-hand end of Fig. 7, showing the shift for the selector drive and the contact slide drive;

Fig. 9 is an elevational view from the right of Fig. 8;

Fig. 10 is a bottom plan view of the shiftable contacts for engaging contacts connected with the anvil bank;

Fig. 11 is an elevational view, partly in vertical section, showing the manual adjustment for the stop which controls the operation of the stop relay;

Fig. 12 is a partial plan view showing the manually operable cam means for selectively disconnecting the drive between the selector units, showing also the drive for the selector units and for the contact-carrying slide;

Fig. 13 is a detail view showing in side elevation one of the selector contact devices;

Fig. 14 is a detail view of the indicator for showing the number of identification columns which are in the cards to be analyzed;

Fig. 15 is a detail sectional view showing the anvil bank;

Fig. 16 is a somewhat diagrammatic view showing the contact comb and associated contacts;

Fig. 17 is a side elevational view of a change pinion mechanism;

Fig. 18 is an axial sectional view showing a different form of selector contact device;

Fig. 19 is a diagrammatic view showing a circuit and apparatus for withdrawing cards;

Fig. 19a is a part-elevational, part-perspective diagrammatic view, showing details of apparatus for use with the circuit of Fig. 19;

Fig. 21 is a diagrammatic perspective view illustrating the operating mechanism for the embodiment illustrated in Fig. 20;

Fig. 22 illustrates the arrangement of the cards and their movement during operation of the embodiment illustrated in Figs. 20 and 21 when so-called master cards are employed as a means for obtaining mechanical selection in the process of filing;

Fig. 23 is a diagrammatic wiring diagram of an electrically operated embodiment of filing and matching apparatus which is entirely record-controlled; and Fig. 24 is a diagrammatic view of a circuit control for the embodiment illustrated in Fig. 23.

Figure 1:
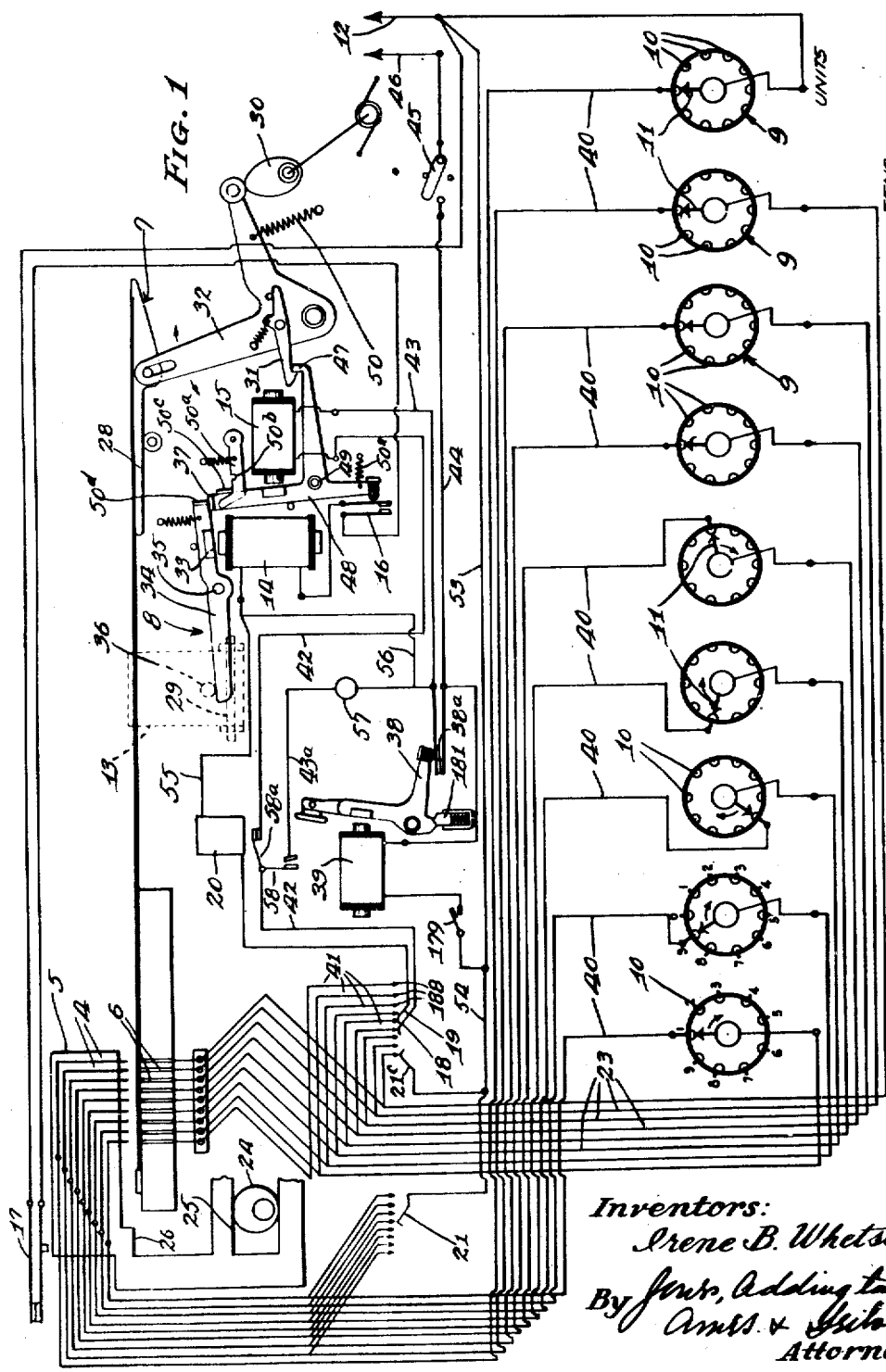
Figure 1 is a diagrammatic view of one embodiment of my invention which mechanically establishes a series of circuits for controlling record selection.

The card filing apparatus shown in Figs. 1 to 16, inclusive, comprises two holders or magazines 1 and 2 for holding complementary stacks of cards, which cards have perforations corresponding to serial numbers or designations with at least one perforation for each order of the card number, a removable filing receptacle 3 in which the cards from the two holders are to be filed in serial order, and means for selectively withdrawing the cards from the two holders and filing them in the receptacle in serial order comprising two groups of sensing contact fingers 4 (Figs. 1, 3 and 5), one for each card holder, two reciprocable heads 5 (Figs. 2, 3 and 5) for periodically bringing the sensing fingers into co-operating relation with respect to the cards, two contact apparatuses, one for each group of sensing fingers, each apparatus comprising a plurality of finger-engaging contact devices or anvils 6, one for each order in the maximum serial card number, said contact devices being engageable by those sensing fingers 4 which pass through the card perforations, means 7 (Fig. 1) for feeding the cards from the holders into co-operative relation with respect to the sensing fingers, means 8 for removing the cards from co-operative relation with respect to the sensing fingers and depositing them in said filing receptacle 3, a plurality of contact selector devices 9 (Figs. 1, 3 and 12), one for each order in the maximum serial card number, each selector device having a plurality of selectable contacts 10, one for each digit in the order to which it corresponds, each of said contacts being electrically connected with one of said contact fingers 4, each selector device also having a selector contact 11 for successively engaging the plurality of selectable contacts 10 of the selector device, the selector contact of the selector device corresponding to the units order being connected with a current supply or line 12 and each of the other selector contacts being electrically connected with one of the finger-engaging contact devices or anvils 6 of the aforesaid contact apparatus, the means for removing the cards comprising a card ejector 13 and means for controlling the action of the ejector comprising an ejection causing relay 14 (Fig. 1) and a conditioning relay 15, said ejection relay 14 having a circuit provided with two make-and-break devices 16 and 17 in series, one of said make-and-break devices 17 being closed following the disengagement of the sensing fingers with respect to the card and the other make-and-break device 16 being controlled by the conditioning relay, said conditioning relay 15 being provided with a circuit having a selector contact 18 successively engageable with the anvils 6 and automatically engageable with the anvil of the highest order indicated by said selector devices.

In a series of cards, identified by perforations corresponding to consecutive serial numbers, one selector device 9 will be provided for each order of the maximum card number; that is to say, there will be provided a units selector device, a tens selector device, a hundreds selector device, etc. Transmission means are provided for driving each of the contact selector devices of a higher order than the units device from a contact selector device of a next lower order by a step-by-step movement, so that at the end of a complete revolution of the units selector device the transmission will cause a one-step single digit movement of the tens selector device, at the end of a complete revolution of the tens selector device the transmission will cause a single one-step one digit movement of the hundreds selector device, etc. Means are provided for selectively disconnecting the transmission between any two adjacent orders of the selector devices to enable the apparatus to be used with different sets of cards having different maximum serial numbers.

Means are also provided for preventing the ejection of a card having a perforation in a column of a higher order than the highest order of the number set up by the selector devices 9, comprising a contact device 19 (Fig. 1) electrically connecting a disabling relay 20 with the anvil 6 corresponding to the next higher order above the highest order of the number set up by the selector devices and a contact comb 21 electrically connecting all of the sensing fingers for this anvil with the power line 12. The contacts 18, 19 and 21 are all mounted on a carriage or slide 21a (Fig. 7) which is automatically shifted from time to time so that the contact 18 will be electrically connected with the anvil corresponding to the highest order of the number set up by the selectors 9, the contact 19 will be connected with the anvil of the next higher order, and the contact 21 will be electrically connected with all of the sensing fingers corresponding to the anvil with which the contact 19 is connected.

A selective drive means is provided for the selector devices engageable selectively with that selector device 9 chosen for the units order.

Power means are provided for advancing the selector devices step-by-step to correspond to the consecutive serial numbers or designations.

Indicating means 22 (Figs. 7 and 14) are provided for showing which of the selector devices is chosen as the units selector.

Means are provided for simultaneously disconnecting all of the transmissions between the selector devices to enable the selector devices to be manually set separably.

Before describing the apparatus in further detail, I will describe the arrangement and operation of the circuit and apparatus, indicated in general in Fig. 1. This shows a selector circuit for use in connection with cards having nine columns for the identification number, nine selectors 9 being shown one for each column in the identification portion of the card; that is to say, one selector being provided for units, another for tens, another for hundreds, etc. These selectors are similar or identical, each comprising a circular series of selectable contacts 10, one for each digit in the card column with which it is associated, each of the contacts of a selector being individually electrically connected with one of the sensing fingers 4 in the column to which it corresponds. In Fig. 1, only one sensing finger 4 is shown for each column, although it will be understood that there is a sensing finger for each digit in the column; that is, if there are ten digits in the units column there will be ten sensing fingers, each finger being individualy electrically connected with one of the selectable contacts 10 on the corresponding selector device.

Underneath each column of sensing fingers, and in alignment with the column of sensing fingers, is an anvil or contact member 6, the arrangement being such that if any sensing finger 4 passes through an opening in the card and engages the anvil 6 underneath, a circuit may be completed which will lead from the particular sensing finger which has passed through the card, through the anvil 6 and one of the conductors 23 to the movable contact 11 on the selector of the next higher order. There is only one contact anvil for each column of sensing fingers, since this anvil may be universal for all of the contact fingers in a column or order. The sensing fingers are mounted on a head 5 which is caused to reciprocate up and down periodically by means of a motor drive which may rotate the eccentric 24 (Figs. 1 and 3) operating in the slot 25 in the eccentric strap 26 on which the sensing finger head 5 is mounted. The same motor 27 (Fig. 3) which reciprocates the sensing finger head 5 may also advance the selector devices 9 step-by-step to correspond to the consecutive serial numbers or designations of the cards being filed. In connection with this discussion, it will be understood that there are two or more sets of apparatus and circuits, such as shown in Fig. 1, one for each of the holders 1, 2, etc., of the complementary stacks of cards.

The feeding of a card from the holder into position underneath the sensing fingers is effected by means of any suitable card feeding mechanism, such as the card feeding slide 28 (Fig. 1).

The ejection of a card from its position underneath the sensing fingers into the filing receptacle is effected by any suitable card-ejection device, such as a card pusher device or ejector 13 pivotally mounted at 29 and shiftable to push the card sidewise from its position underneath the sensing fingers 4 into the filing receptacle 3. The slide for feeding the card from the card holder underneath the sensing fingers is controlled by a cam 30 (Fig. 1) constantly driven by the motor 27 in suitable timed relation with respect to the reciprocation of the sensing fingers 4 and the step-by-step movement of the selectors 9. This rotating cam 30, however, has no effect on the card feeding slide 28, unless the latch 31 pivotally mounted on the bell crank slide actuating lever 32 is released. The card-ejecting pivoted push member 13 is actuated by means of the relay 14, the armature 33 of which is mounted on a lever 34 pivotally mounted at 35 and engageable with a suitable arm 36 on the pivoted card pusher member 13. This card-ejecting relay, however, is not effective until the contacts 17 are moved into engagement and the retainer or latch 37 is moved out from underneath the tip of the card pusher actuating lever 34. Both the latch 31, which controls the card feeding slide 28, and the retainer 37, which controls the card-ejecting relay 14, are controlled by means of the conditioning relay 15, which conditioning relay is in turn controlled by the co-operative action of the sensing fingers 4 and the selector devices 9. If the perforations in the card being sensed or analyzed are such that the contacts made between the sensing fingers 4 and the anvil banks 6 correspond to the contacts established by the selector devices 9, a series circuit will be established which will energize the conditioning relay 15, causing the ejection of the card after it has been analyzed and causing the feeding in of another card underneath the sensing fingers.

In order to insure that the card ejector does not operate until the sensing fingers have been withdrawn from the holes in the card, the make-and-break device 17 is provided in the circuit for the ejector relay 14, which make-and-break device is closed by the upward movement of the sensing finger head 5, but not, however, until the sensing fingers have been completely withdrawn from the holes in the card.

A suitable manually operable switch 38 is provided for initiating the operation of the machine and a suitable automatically operated relay 39 co-operating with the switch 38 is provided for stopping the operation of the machine when it has run its full course, as will be described more in detail later. Also, a suitable make-and-break relay device 20 is provided in the circuit for the conditioning relay 15, in order to prevent the undesired ejection of a card, which may have a perforation in a column of a higher order than that corresponding to the highest order indicated by the selector devices.

In describing the circuit for the selector devices, sensing fingers, anvil banks, and conditioning relay, I will assume three cases, one in which the perforations in the card being analyzed correspond to the number set up by the selector devices 9; another in which the number indicated by the perforations on the card being analyzed does not correspond to the number set up by the selector devices; and a third in which the order of the number of one of the cards being analyzed is of a higher order than that set up by the selector devices. Assuming, for example, that the card being analyzed is No. 222 and that the number indicated by the selector devices is also No. 222, then the circuit will be from the right hand side of the line 12, through the movable selector contact 11 of the units selector device to the No. 2 selectable contact 10 on this selector device, thence through a conductor 40 to the No. 2 sensing finger 4 in the units column which has passed through the No. 2 opening in the card into engagement with the units column anvil 6; thence through a conductor 23 to the movable selector contact 11 of the tens selector device; thence to the No. 2 selectable contact 10 on the tens selector device; thence through a conductor 40 to the No. 2 sensing finger 4 in the tens column which finger has passed through the No. 2 hole in the card into engagement with the tens column anvil; thence through a conductor 23 to the movable selector contact 11 of the hundreds selector device to the No. 2 selectable contact on this device; thence through a conductor 40 to the No. 2 contact finger in the hundreds column, which has passed through the No. 2 hole in the card into engagement with the hundreds column anvil; thence through a branch conductor 41 to the contact 18, contacts 58a connected with a conductor 42 leading to the conditioning relay 15; thence through the conductor 43, contacts 39a of switch 38, conductor 44 and switch 45 to the line wire 46. This will cause energization of the conditioning relay 15, closing of the switch 16, releasing of the lever 34 and unlatching of the latch 31. Thereafter the head 5 closes the switch 17 energizing the relay 14, causing the ejector 13 to eject the card into the receptacle 3. Thereafter, the cam 30 operates the feed slide 29 to feed another card under the sensing fingers, the latch 31 relatching on the hook 47 to prevent a repetition of the feeding action.

Thus, if there is correspondence between the holes in the card and the selector set-up, the card being analyzed will be ejected and another card will be fed on from the holder under the sensing fingers. As indicated, the energization of the conditioning relay 15 rocks the three-armed lever 48, which is pivotally mounted at 49, unlatching the armature lever 34 of the ejector relay 14, closing the ejector relay switch 16 and releasing the latch 31 which allows the card feeding slide 29 to be operated by means of the cam 30, the coil tension spring 50 holding the follower of the bell crank lever 32 in engagement with the cam as it is rotated in timed relation with respect to the movement of the sensing fingers and selector devices. When the conditioning relay 15 is energized and the upper end of the lever 48 moved to the right, the lever 48 is latched in this position by the spring latch 50a, the notch 50b of which receives the finger 50c on the lever 48. The lever 48 remains latched until the energization of the ejecting relay 14 causes the finger 50d on the lever 34 to engage and release the latch 50a, thus releasing the lever 48 which is returned by the spring 50e.

In this discussion, it is to be understood that the two sets of selector devices and the associated mechanisms for the two complementary card holders are operated in synchronism so that each set of selector devices successively and simultaneously sets up corresponding numbers. Thus, if the No. 222 is set up on the selector devices for one card holder, No. 222 will also be set up simultaneously on the selector devices corresponding to the other card holder. Since it is assumed that the cards are complementary and together constitute a complete sequence, the card called for by the selector devices will appear in one or the other of the two card holders and will be ejected therefrom when called for.

Considering now the case where the number set up by the selector devices does not correspond to the numbers punched on the card being analyzed, and assuming, for example, that the card being analyzed is No. 232, while the number set up by the selector devices is No. 222, it will be seen that the circuit for the conditioning relay will be discontinuous. Following the circuit under these assumed conditions, it will be from one side 12 of the line, through the No. 2 contact 10 of the units selector device 9, through a conductor 40 to the No. 2 sensing finger 4 of the units column to the column No. 1 anvil 6; thence through a conductor 23 to the No. 2 contact 10 on the tens selector device; thence through a conductor 40 to the No. 2 sensing finger in the tens column where the circuit will be broken, since there is no No. 2 hole in the tens column of the card. This card will, therefore, be held underneath the sensing fingers until called for later. The sensing fingers will, of course, continue to be moved up and down until this card number is called, but until the card number is called, a proper circuit for causing ejection will not be established.

I will now consider the case where the number punched in the card being analyzed is of a higher order than the number set up by the selector devices but in which there is correspondence between the digits in the number set up by the selector devices and the digit perforations corresponding in the card. Assume, for example, that the card being analyzed is No. 13, while the number set up by the selector device is 3. It will be seen, from what has been stated heretofore that this card would be ejected unless means were provided for preventing such ejection. The preventing means provided for this purpose comprise a make-and-break contact device 58a in the circuit for the conditioning relay 15, which make-and-break device is controlled by the relay 20 connected to the contact 19 which, it will be remembered, is selectively and successively engageable with contacts connected with the anvils and mounted on the same slide 21a (Fig. 7) on which the connector contact 18 for the conditioning relay is mounted. The anvil connector contact 19 for the disabling relay 20 is so positioned with respect to the anvil connector contact 18 for the conditioning relay 15 that it will connect with the anvil of the next higher order above that to which the contact for the conditioning relay is connected. The disabling relay 20 is so designed that it will operate to open contact device 58a and break the circuit for the conditioning relay 15 before the conditioning relay can operate. In order to provide a circuit for operating this relay 20, the wiping contact comb 21 (Fig. 16) is provided having ten contact fingers 51, one for each digit in a column, which contact comb is also mounted on the same slide 21a on which the anvil connector contact 18 for the conditioning relay is mounted. This contact comb 21 co-operates with a set of contacts 52 (Fig. 16) which are electrically connected, one with each finger of the set of sensing fingers 4 except those sensing fingers in the units col... ...act comb is so positioned and designed that it will supply current to that column of fingers 4 which is directly above and co-operates with that anvil 6 to which the disabling relay contact 19 is connected. Under these conditions and assuming, as aforesaid, that the number set up on the selector devices is 3 and that the card being analyzed is 13, the circuit will be from the line 12 through the conductors 53 and 54 and through the contact comb 21 to the No. 1 contact finger in the tens column, which is allowed by the perforation on the card to engage the tens anvil 6 from whence the circuit is through a conductor 41 to the disabling relay contact 19, thence through the disabling relay 20, conductors 55 and 56, contacts 38a of the switch 38, conductor 44 and switch 45 to the other side 46 of the line. An ejecting circuit would also have been established except for the fact that the disabling relay 20 is so designed that it will operate before the conditioning relay can operate. The disabling relay 20 when operated may also, if desired, establish a signal circuit through a signal device 57 by means of the contact device 58 which may indicate to the operator that a card is misplaced if the signal is made repeatedly over a long period.

I will now describe, in more detail, various parts of the apparatus.

*Drive for the selectors and sensing fingers (Figs. 3, 7 and 12)*

The drive for the sensing finger head is from the motor 27 through the worm 59, worm gear 60, bevel gear 61 rotatable with the worm gear, bevel gear 62 meshing with the bevel gear 61, shaft 63 on which the bevel gear is mounted, bevel gear 64 mounted on the shaft, bevel gear 65 driven from the bevel gear 64, shaft 66 on which the bevel gear 66 is mounted, eccentric 24 on this shaft, and eccentric strap 26 driven by the eccentric, on which strap the sensing finger head 5 is mounted.

Figure 3:
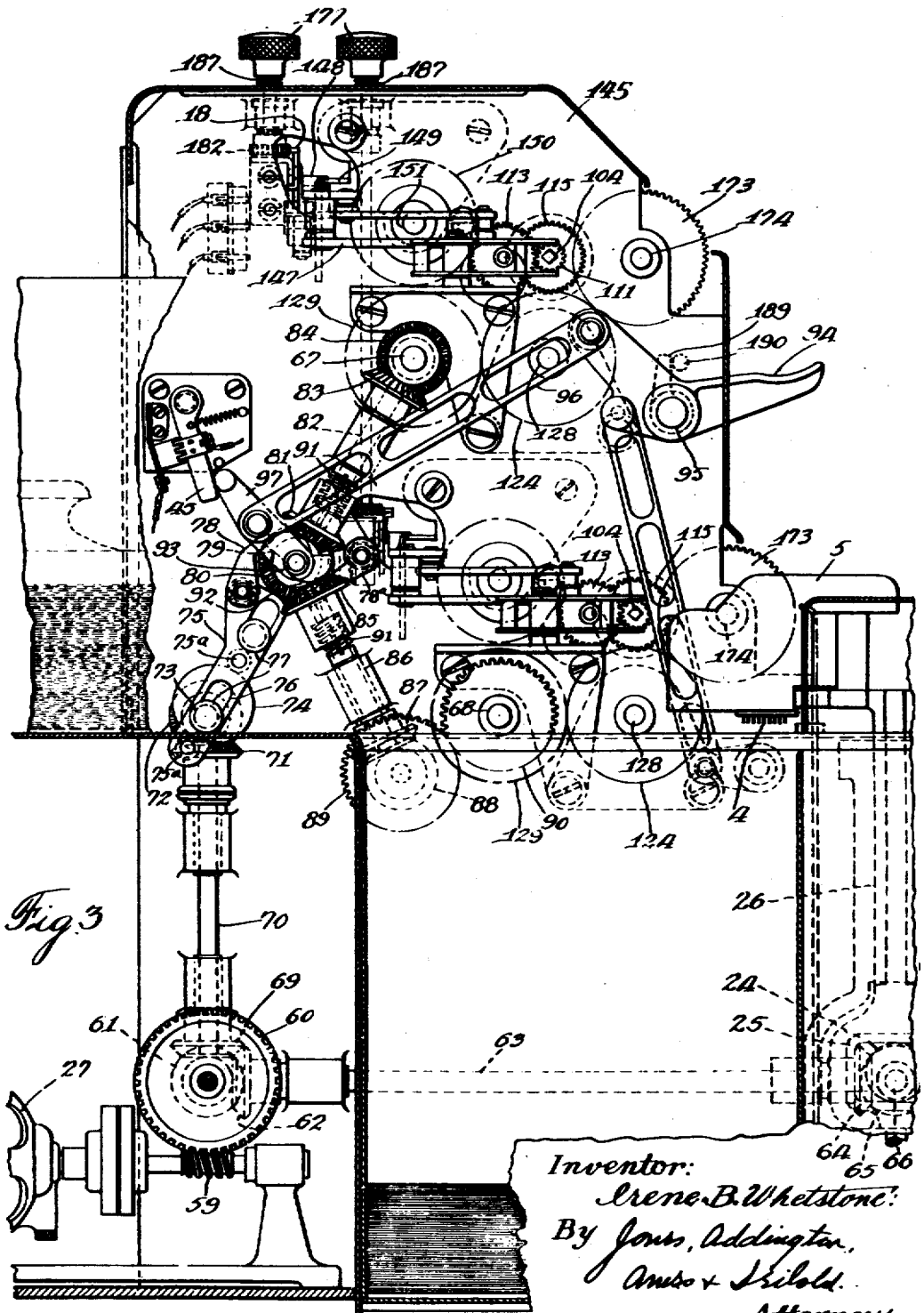
Fig. 3 is a vertical fore-and-aft section of part of the apparatus, showing the motor drive for the sensing finger head, the selectors, and the contact-shifting mechanism.

The upper selector mechanism and associated parts for the card holder 1 are driven from the horizontal shaft 67 (Figs. 3 and 9). The lower selector devices and associated mechanism for the card holder 2 are driven from the lower horizontal shaft 68. The drive from the motor 27 to the upper horizontal shaft 67 includes a bevel gear 69 meshing with the bevel gear 61; a shaft 70 on which this bevel gear 69 is mounted, a bevel gear 71 mounted on this shaft 70, a bevel gear 72 meshing with this bevel gear 71, a shaft 73 on which gear 72 is mounted, an eccentric 74 mounted on this shaft 73, a slide 75 with followers 75a in engagement with the periphery of the eccentric 74, shiftable back and forth by the eccentric 74 and guided by the slots 76 and co-operating pins 77, a pawl 78 mounted on this slide, a ratchet wheel 79 driven step by step by the pawl 78 and retained in each successive step by a pawl 78a, a bevel gear 80 rotatable with the ratchet wheel 79, a bevel gear 81 meshing with this bevel gear, a shaft 82 on which the bevel gear 81 is splined, a bevel gear 83 mounted on the shaft 82, and a bevel gear 84 driven from the bevel gear 83 and mounted on the upper horizontal drive shaft 67 for the upper set of selectors. The drive for the lower selector includes the bevel gear 85 driven from the step-by-step driven bevel gear 80, a shaft 86 on which the bevel gear 85 is splined, a bevel gear 87 mounted on this shaft, a bevel gear 88 meshing with this bevel gear, a spur gear 89 rotatable with this bevel gear, and a spur gear 90 meshing with the spur gear 89 and mounted on the horizontal shaft 68 for the lower set of selectors.

Figure 2:
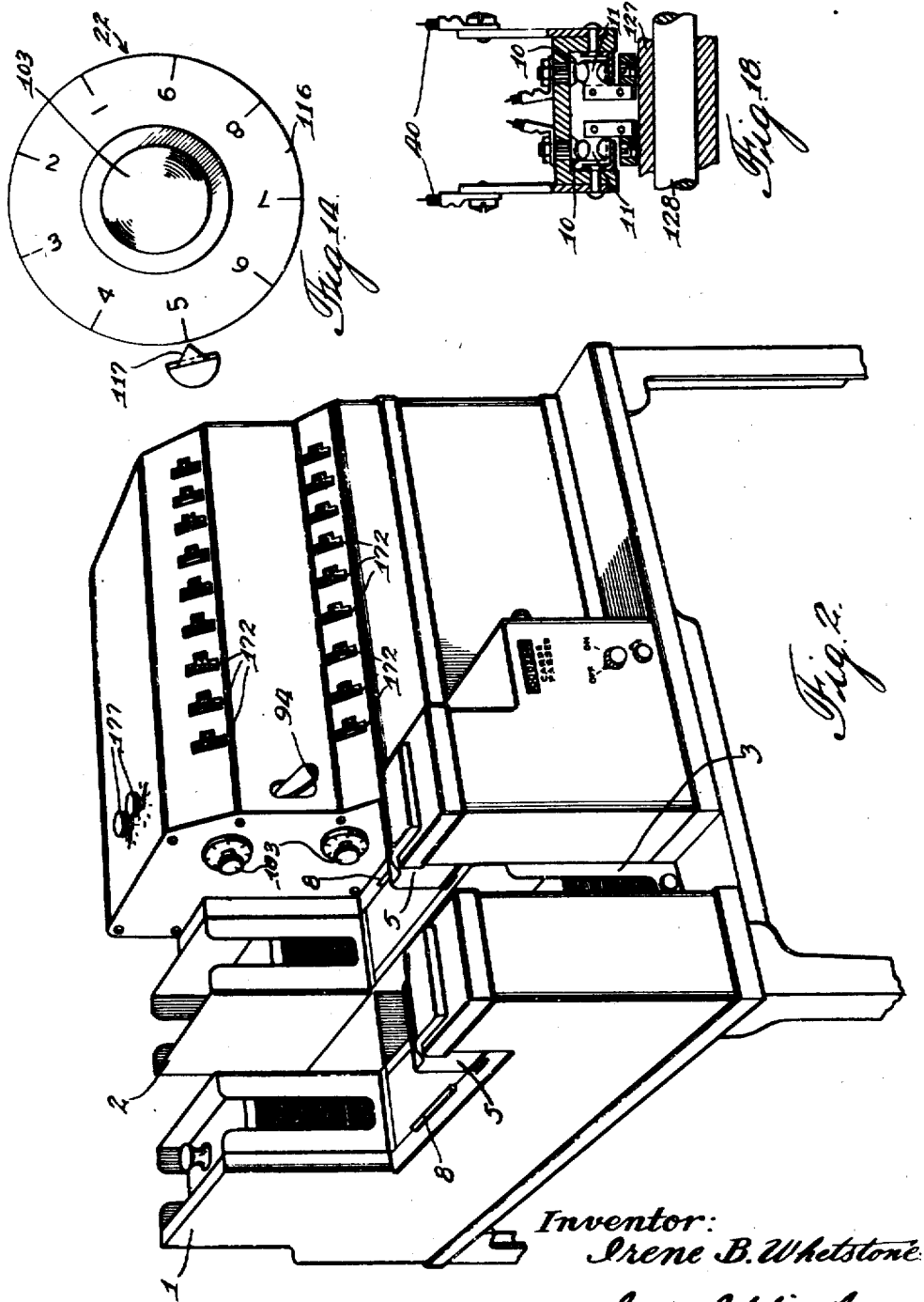
Fig. 2 is a perspective view showing the general arrangement of the apparatus.

In order to disconnect the drive from the selectors for setting, etc., the bevel gears 81 and 85 are splined on their shafts so that they can be slid to non-meshing position against the action of the springs 91. In order to unmesh the gears 81 and 85, a cam 92 is provided having cam portions engaging the gears 81 and 85 and rotatable about the shaft 93. This cam 92 may be rocked to unmesh the gears 81 and 85 by means of a hand lever 94 (Figs. 2, 3 and 12). This hand lever 94 is pivotally mounted at 95, and is connected with the cam 92 by means of a link 96, and an arm 97 rotatable with the cam 92. The operation of the hand lever 94 also causes the line switch 45 to open (Figs. 1 and 3) and disconnects all of the Geneva drives between the selectors 9 as will be described in more detail later.

The upper and lower sets of selector devices are substantially duplicates. The construction of one of these, the upper one, is shown in detail in Figs. 7 to 12, inclusive. Before describing these in detail, it may be well to state that manually operable selective means are provided for choosing any one of the selector devices as the units selector device, and for disconnecting from the drive all of the selector units to the right of the one chosen as the units device. These means are also in duplicate. One of the purposes of this construction is to enable the analysis of a card in which the number of columns in the card used for indicating the card number is less than the number of selectors 9 in the apparatus. Thus, if a series of cards ran up to only 99,999 and if the field, including these columns, was at the extreme end of the card, it would be necessary to throw out of commission the four right-hand selectors corresponding to the four right-hand columns of sensing fingers, as viewed in Figs. 1, 7 and 12. For this purpose, each Geneva transmission between adjacent selector units 9 is so designed that it can be placed in inoperative condition so that there will be no drive between two adjacent units. For this purpose, the change or tens transfer pinion 99 of each Geneva drive is mounted on a slidable crosshead 100 mounted in suitable guides 101, a spring 102 being provided which normally holds the Geneva drive in operative relation with respect to the two adjacent selector devices 9 with which it co-operates. In order to disconnect any desired one of these Geneva drives, a pair of manually operable turnbuttons 103 (Figs. 2 and 7) are provided, one for each of the two sets of selector devices, which respectively drive a pair of cam shafts 104 (Figs. 7 and 12) on each of which is mounted eight cams 105, one for each of the Geneva drives 98. The cam portions 106 of these cams are set in spiral relation to shaft 104 so that, by setting the cam shaft in the desired position, any desired one of the Geneva drives may be put out of commission. Each of these cams 105 is in co-operative relation with a rock member 107 pivotally mounted at 108 and having a notch or fork 109 for receiving a trunnion 110 on the crosshead 100 which carries the change pinion of the Geneva drive. When one of these cam members pushes the upper end of the rock member 107 to the right, as viewed in Fig. 12, the crosshead 100 will be depressed to move the change pinion 99 of the Geneva drive out of operative position and to move a tooth of pinion 99 into a notch 101b (Fig. 17) of post 101a in the stationary frame of the crosshead carriage, thus preventing any torsional movement to be accidentally imparted to the change pinion 99 while in unmeshed position.

In order that power may be supplied to the contact 11 of the selector chosen as the units selector in the event that any selector other than the one at the extreme right (as seen in Fig. 1) is chosen, it is necessary to provide an additional contact 21c in the circuit of the selectors. As shown in Fig. 1, power from the conductor 12 is led directly to the contact 11 of the right-hand selector. If any selector other than the right-hand selector is chosen as the units selector, power from the conductor 12 must be shifted to the contact 11 of the selector chosen as the units selector and must remain in this condition throughout the analysis of the cards. Figs. 1, 7 and 12 show how this contact 21c may be mounted and controlled by means of the turnbutton 103 when making the selection of the units selector. This contact 21c is mounted on a frame 21b, which is slidably mounted on the guide rod 144 and axially shiftable with the shaft 67. As the shaft 67 remains stationary after being set, the contact 21c will maintain its position throughout the analysis of the cards. The slidable frame 21b is shown as secured to a pair of collars 21g by means of screws 21f, the collars 21g being located on opposite sides of the hub of one of the gears 129 so that axial shifting of this gear will cause a corresponding shifting of the frame 21b carrying the contact piece 21c. As will be pointed out more in detail hereinafter, this contact 21c connects selectively with one of the anvil banks 9 and hence with one of the conductors 23 leading to the movable contact 11 for one of the selectors to the left of the right-hand selector, as viewed in Fig. 1. By suitable shifting of the contact 21c, it may be brought into connection with any one of the selectors to the left of the right-hand selector to enable any one of these selectors to be chosen as the units selector. In order to provide a torque multiplication between the turnbutton and cam shaft for easy shifting, a back-geared construction is provided (Figs. 7 and 12), including a pinion 111 swiveled on the cam shaft 104 and having a squared hole to receive the squared end of the shank 112 of the turnbutton, a spur gear 113 meshing with this pinion, a pinion 114 rotatable with the spur gear 113, and a spur gear 115 meshing with this pinion 114 and mounted on the cam shaft 104.

In order to indicate the position of the cam shaft and hence show which one of the Geneva drives is disconnected, a rotatable indicator dial 116 (Figs. 7 and 14) is provided co-operating with a pointer 117 on the casing. This indicator dial 116 is driven in the same direction and at the same rate as the cam shaft 104 by means of a pinion 118 meshing with the spur gear 115, a shaft 119 on which the pinion 118 is mounted, a pinion 120 mounted on the shaft 119 and a spur gear 121 meshing with the pinion 120 to which the indicator dial 116 is secured.

In order definitely to position the turnbutton 103 and hence the cam shaft 104 when in set position, a pin 122 is provided mounted on a disc 123 secured to the shank 112 of the turnbutton and co-operating with a hole in the casing. The turnbutton and shank are shiftable axially to enable this pin 122 to be moved out of the hole when it is desired to set the cam shaft. The back gearing between the turnbutton 103 and the cam shaft 104 is such that a complete revolution of the turnbutton will shift the cam shaft one-eighth of a revolution to change the point of disconnection between the selectors from one Geneva gear to the next adjacent Geneva gear.

Since it is proposed to use any desired one of the selectors as the units selector device, means must be provided for shifting the point of driving connection to correspond with the selector chosen so that the selector chosen as the units selector will be driven direct from the main drive.

Before describing the means by which this shift in driving point is effected, I will briefly describe the Geneva drive, this drive being identical for each of the selector units. This Geneva drive comprises a large driven gear 124 (Figs. 3, 9 and 12) which may be selectively connected with the main drive, a hub 125 on which this gear is mounted and a conventional form of Geneva gearing including the Geneva drive disk 98 secured to hub 125, the change pinion 99 and the gear 126 fixed on the hub or sleeve 127 (Figs. 12 and 13) on which the rotatable wiper contact 11 of the selector 9 is mounted. All of the hubs 125 and 127 may be rotatably mounted on a shaft 128 (Figs. 3, 9 and 12). In order to shift the point of drive from shaft 67 to any desired one of the large gears 124, a set of drive gears is provided, one drive gear 129 being provided for each of the large driven gears, the spacing of the drive gears 129 being somewhat less than the spacing of the driven gears 124, these drive gears 129 being mounted on the drive shaft 67 which is shiftable axially to bring any desired one of the drive gears 129 into operative relation with its co-operating driven gear 124. This shift in driving point must be effected in correspondence with the disconnection of the Geneva drives. For this purpose, the cam shaft 104, which determines which Geneva drive is connected, is provided with a snail cam 130 (Figs. 7, 8 and 9), the position of which determines the axial position of the drive shaft 87 and hence determines which one of the driven gears 124 will be connected with a driving gear 126. The means by which the position of the snail cam determines the axial position of the drive shaft 87 comprises a cam follower roller 131 co-operating with the snail cam 130, a rock arm 132 on which this follower roller is mounted, a link 133 pivotally connected with the rock arm 132, a rocker yoke 134 pivotally mounted at 135 to which the link 133 is pivotally connected at 136, and a bracket 137 slidably mounted on a pair of guide pins 138 extending from the frame plate 139 and controlled in its slidable movement by the engagement of the cross bar 140 of the yoke 134 with a stud 141 secured to the bracket 137, the shaft 87 carrying the series of drive gears 129 being swiveled in the bracket 137 as indicated at 142 so as to be moved axially when the bracket is caused to slide on its guide pins 138. The design of the cam 130 is such that a rotation of the cam shaft 104, sufficient to shift the point of disconnection of the Geneva drive from one selector to the next adjacent selector, will also be sufficient to shift the shaft 87 axially enough to change the point of drive from one of the gears 129 to the next adjacent gear 129, thus shifting the drive from one selector to the next adjacent selector. Thus, when the turnbutton 103 is manipulated to choose one of the selectors as the units selector, the drive from one of the gears 129 will automatically be connected with this chosen selector.

From what has been said, it will be seen that it is necessary to provide means for advancing the contacts 18, 19 and 21 (Figs. 1 and 7) step by step each time the number set up by the selectors changes from one order to the next higher order. Thus, when the set-up is changed from 9 to 10, the conductors 18, 19 and 21 should be advanced one step. When the number set up changes from 99 to 100, the aforesaid contacts should be shifted another step, etc. It is also necessary that these contacts should be initially placed in proper position to co-operate with that selector which is chosen for the units selector. In order to accomplish these results, the contacts 18, 19 and 21 are mounted on the carriage 21a (Fig. 7) which is slidably mounted on a guide rod 144 extending between the frame members 139 and 145. This sliding carriage 21a is subject to two controls, one from the same rocker yoke 134 which controls the axial position of the drive shaft 87, and another control which is exercised by a gear driven cam 146 (Figs. 7 and 12) which actuates a rock arm 147 on which a pawl 148 is mounted, co-operating with a rack 149 secured to the slidable carriage 21a. There is, however, a co-operation between the two controls, in that the control by the rocker yoke 134 selectively connects one of the gears 150 on the slidable shaft 151 with the selected one of the gears 124 associated with the selectors 9. However, after this initial drive connection has been effected, the drive will thereafter be automatically shifted from time to time as the order of the number set up by the selectors changes, this latter shift being effected by the aforesaid cam 146 which operates to advance the rack one step each time the cam is rotated, this cam having an abrupt drop which allows the spring 152 to snap the upper end of the arm 147 to the left, as seen in Fig. 7, to cause the pawl 148 to advance the rack 149 one step each time that the order changes.

In order to make the yoke-controlled shift for the selector drive effective, the gears 150 on the axially movable shaft 151 are spaced differently from the idler gears 153 with which they are selectively meshed, these idler gears being driven from the selector gears 124, respectively, and being mounted on a shaft 154 mounted on the side plates 139 and 145. The yoke-controlled movement of the shaft 151 on which the set of driven gears 150 are mounted is effected by means of a segment gear 155 pivotally mounted at 156 on a stationary frame or bracket 156a and connected by a link 157 with an extension 158 on the slidable bracket 137 which controls the axial movement of the gears 129. This segment gear 155 engages a rack 159 on a slide 160 mounted on the guide rod 144, this slide having a finger 161 engaging the hub of one of the gears 150 (Figs. 7, 8 and 9) so that the sliding movement of this slide 160 will effect axial movement of the entire set of gears 150 mounted on the gear shaft 151. The arrangement and design is such that the initial setting of the rocker yoke 134 by means of the turnbutton 103 will connect one of the driven gears 150 with the idler 153 corresponding to the selector chosen for the units selector.

After this initial positioning of the gear shaft and set of gears, it will thereafter be given a step-by-step movement by means of the pawl 148 and rack 149, a one-step movement being effected each time the order of the number set up by the selector changes. Thus, when the order of the number set up by the selectors changes from units to tens, the gear set will be shifted to bring one of the gears 150 into mesh with the idler 153 corresponding to the tens selector; when the number set up by the selectors changes from the tens to the hundreds order, the gear set will be shifted to bring one of the gears 150 into mesh with the idler 153 corresponding to the hundreds selector device, etc. This will cause a corresponding step-by-step advance of the contacts 18, 19 and 20, as the order of the number set up by the selectors changes. From the above, it will be understood that the first axial movement of the gears 150 and shaft 151 is effected by means of the finger 161 on the slide controlled by the snail cam 130.

It will be seen that it is necessary to disconnect the pawl 148 from the rack 149 when the turnbutton 103 is being used to make the initial choice of the units selector, as this setting of the button 103 not only chooses the units selector but also is designed to connect the desired one of the gears 150 with the idler 153 corresponding to the units selector. In this setting action, the slide 21a must be free to assume a position determined by the shifter finger 161 and consequently must be free from the pawl 148.

In order to effect this disconnection of the pawl 148, means are provided whereby pushing in the turnbutton 103 against the action of the coil compression spring 162 (Figs. 7 and 12) to free the pin 122 from the hole in the side of the casing will automatically throw out the pawl 148. The means provided for this purpose comprises a spring-pressed bell crank lever 163, one end 164 of which bears against a disc 165 on which the pin 122 is mounted and one arm 166 of which is connected wtih the pawl 148 by means of a link 167. This bell crank lever 163 is pivotally mounted at 168 on a bracket 169 secured to the side frame plate 145. A coil tension spring 170 is provided connected to another arm 171 of the bell crank lever which tends to hold the pawl 148 in co-operative relation with respect to the rack 149.

It may be desirable to provide indicating means for showing the number set up by the selectors and for this purpose a plurality of numbered indicating wheels 172 (Figs. 2 and 12) may be provided, one for each selector, each of these number wheels being driven direct from the corresponding selector gear 124 which meshes with a gear 173 (Figs. 3 and 12) rotatable with the number wheel 172. These number wheels are rotatably mounted on a common shaft 174 extending between the frame plates 139 and 149.

In connection with the above description, it will be understood that the lower set of selector mechanisms, including the selectors 9, the sets of gears 129, 124, 150, idlers 153, and numbering wheel gears, is a substantial duplicate of the upper set of selector mechanisms described in detail, the same reference characters being used for corresponding parts in the two selector mechanisms. In setting the selector mechanisms, they should always be set to similar positions; that is, corresponding selectors should be chosen for the units selector in both sets, etc.

Stop relay

It is desirable that means be provided for automatically stopping the operation of the machine when a certain number has been set up by the selector devices. In other words, if the operator knows that the highest card to be filed is 100,000, it is desirable that the machine be set to stop its operation when the No. 100,000 card has been reached. For this purpose, the switch 38 is provided, operated by the relay 39, which will break the main line circuit and stop the machine. The circuit for the relay 39 itself is controlled by means of a make-and-break contact device 175 actuating the contacts 179 (Figs. 1, 7 and 11), the closing of which is effected by means of an adjustable stop 176, the position of which stop is controlled by means of a manually operable turnbutton 177 (Figs. 1, 3, 7 and 11). The make-and-break contact device itself is mounted on the slide 21a. When the slide 21a in its movement brings the pivoted contact-actuator 178 into engagement with the adjustable cam stop 176, the actuator 178 is depressed, causing the contacts 179 to close as the actuator 178 presses down on the slide pin 180 which engages the upper contact 179. This closing of the contacts energizes the relay 39, opening the switch 38 and stopping the operation of the apparatus. The switch 38 is held in either open or closed position by means of the double acting spring latch 181 (Fig. 1). The turnbutton 177 controls the position of the cam stop by means of a pinion 182 on the shank of the turnbutton meshing with a rack 183 on the slide 184 which carries the cam stop. In order to definitely position the cam stop, the bushing 185, in which the shank of the turnbutton is slidably and rotatably mounted, may have a plurality of properly spaced notches cooperating with corresponding radial ribs on the upper face of the enlarged portion 186 of the turnbutton shank. A coil compression spring 187 normally holds the radial ribs in engagement with the radial notches. A similar adjustable cam stop, turnbutton and associated mechanism are provided for the lower selector mechanism.

In order to provide proper spacing and operation of the contacts 18 and 19 and to enable the shifting of contacts in the relatively short movement given the slide 21a, the construction shown in Figs. 7 and 10 may be employed. As here shown, the nine contact points 188 corresponding to anvils 1 to 9, inclusive, are arranged in three parallel rows, the contact points of one row being staggered with respect to the contacts of the other row. Each of the contact wipers 18 and 19 may be in the form of a three-fingered contact member, one finger co-operating, respectively, with one of the three rows of contact points leading to the anvils. With this arrangement in the first position, the upper contact finger of the contact member 18 (as viewed in Fig. 10) will be in engagement with the contact 188 for the No. 1 anvil; the second contact finger of the contact piece 19 will be in engagement with the contact point 188 for the No. 2 anvil, and all of the other contact fingers of the contact pieces 18 and 19 will not be in engagement with any of the contact points for the anvils. When the slide 21a is shifted one step to the left, as viewed in Fig. 7, it will bring the middle contact finger of the contact piece 18 into engagement with the contact point 188 for the No. 2 anvil and will bring the lower contact finger of the contact piece 19 into engagement with the contact point 188 for the No. 3 anvil. When the slide 21a is shifted another notch to the left, it will bring the lower contact finger of the contact piece 18 into engagement with the contact point 188 corresponding to the No. 3 anvil and will bring the upper contact finger of the contact piece 19 into engagement with the contact point 188 corresponding to the No. 4 anvil. Successive steps of the slide will successively establish the desired contact between the contact pieces 18 and 19 and the anvils.

The previously described contact piece 21c may be similar in shape to the contact pieces 18 and 19 and may be made to cooperate with the upper ends of the contacts 188, as shown in Fig. 7. This enables current to be supplied to the movable contact 11 of the selector chosen as the units selector.

It may sometimes be desirable to set the selector mechanisms initially to some desired number. Thus, the operator may know that none of the cards to be filed are lower than, for instance, 6,000. Knowing this, he can avoid useless operation of the apparatus by setting both selector mechanisms up to this number. For this purpose, it is desirable to disconnect all of the change pinions 99 operating between the selector mechanism 9, since it would be impossible to set the selector devices separately and individually if the Geneva drives were in effective position. In order equally to disconnect all of the Geneva drives, means are provided whereby depressing the lever 94 will disconnect the drives collectively. The means provided for this purpose comprises a set of fingers 189 (Fig. 3), one for each of the slidable crossheads 100 on which the change pinions 99 are mounted. These fingers 189 are mounted on the shaft 95 on which the lever 94 is mounted and each finger engages a pin 190 on the crosshead 100 so that when the lever 94 is depressed all of the crossheads are moved forward to disconnect the change pinions 99. Depression of the lever 94 at the same time unmeshes the bevel pinions 81 and 85 so that they are free to rotate. Depression of the lever 94 also allows the switch 45 to open so that the power is disconnected.

Sensing fingers and head

Figure 4:
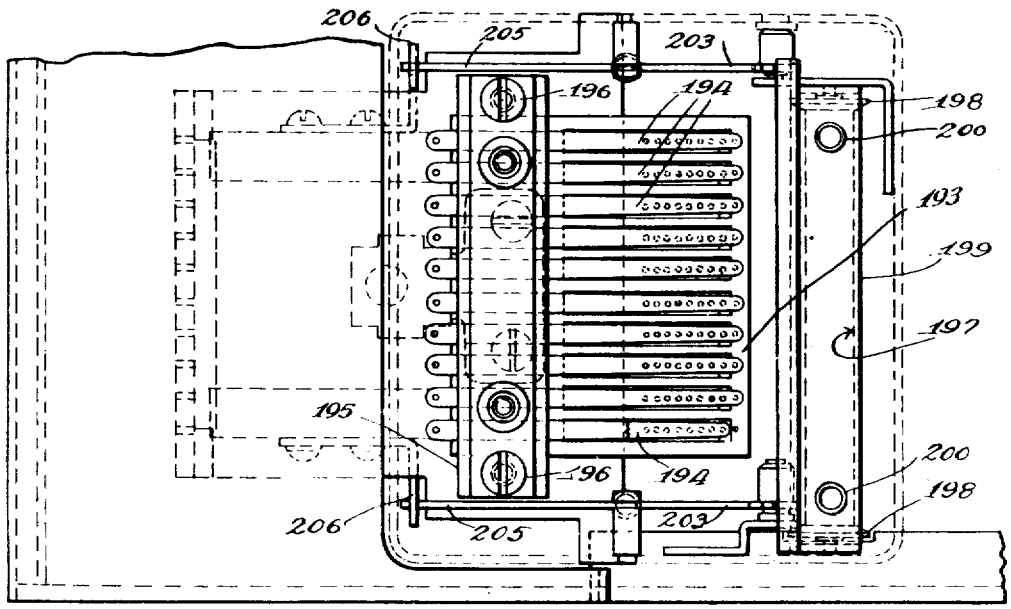
Fig. 4 is a plan view of the sensing finger head.
Figure 5:
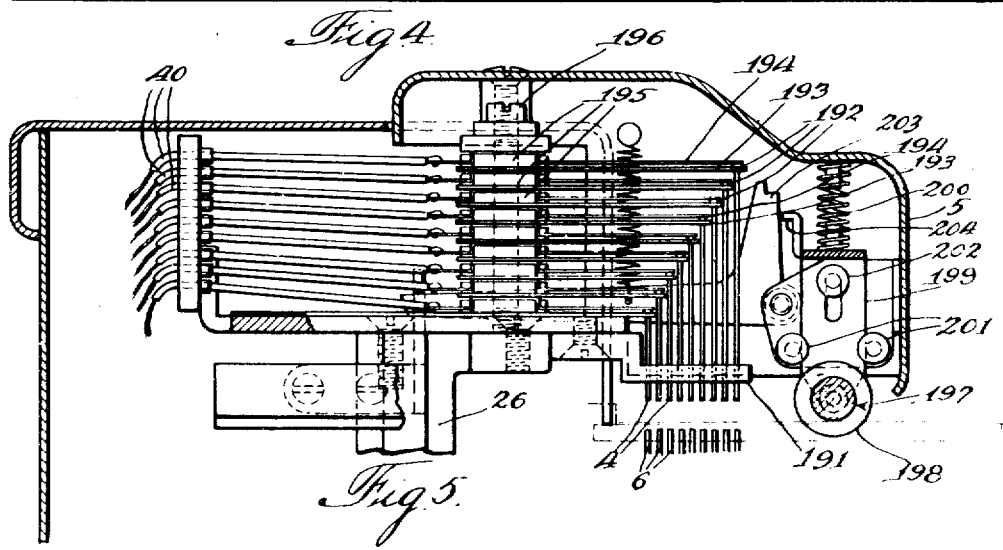
Fig. 5 is a vertical fore-and-aft section showing the sensing finger head and associated parts.
Figure 6:
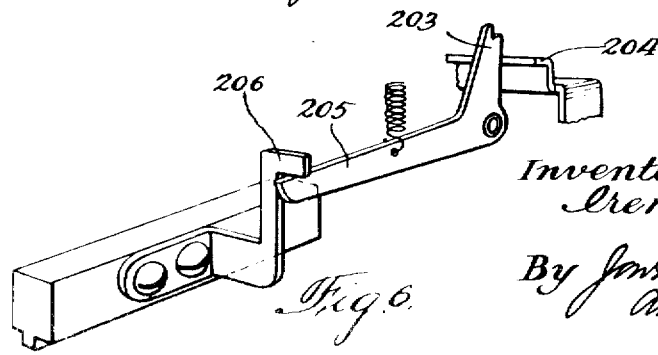
Fig. 6 is a perspective view of the control for the card guide roller.

The sensing fingers and head are shown in detail in Figs. 4, 5 and 6. The lower ends of the sensing fingers 4 are slidably mounted in a perforated guiding and positioning plate 191 which is mounted on and moves up and down with the head 5 as it is reciprocated by means of the eccentric strap 26. These sensing fingers 4 must be yieldingly mounted so that if there is no perforation in a card corresponding to one of the fingers, the head can move downwardly without causing the sensing finger to injure the card. For this purpose, the upper end of each sensing finger is provided with a head 192 which is held between an apertured plate 193 of non-conducting material and a spring finger 194 of conducting material, the insulating plate 193 serving as a lifting plate and the spring finger 194 serving as a depressing finger which will yield in case there is no perforation in the card corresponding to this finger. The sensing finger may extend through an opening in the lifter plate 193, the spring finger 194 resting on the upper ends of the head 192 of the sensing finger. The apertured plates 193 and spring fingers 194 may be clamped or otherwise suitably secured to the upper end of the eccentric strap 26. The means shown for this purpose comprises a stack of clamping plates 195 of insulating material held together by clamping screws 196. The sensing fingers 194 are of conducting material, each sensing finger being connected with a conductor 40 leading to one of the contacts 10 on one of the selectors 9.

In order to guide the card as it is being fed under the sensing fingers, a guide roller or spool 197 is provided having side flanges 198 co-operating with the side edges of the card. In order to enable proper ejection of the card, means must be provided whereby this guide roller 197 will be lifted clear of the path of the card as the card is being ejected and yet will enable the guide roller to be completely depressed when the sensing finger head 5 is in its highest position and another card is being fed under the sensing finger. For this purpose the guide roller is mounted on a carriage or slide 199, which carriage is mounted for vertical sliding movement on the head 5, a pair of coil compression springs 200 being provided, tending to hold the roller carriage 199 in its lowermost position. This carriage 199 may be guided in its sliding movement by means of two pairs of pins 201 engaging the side edges of the vertical portions of the carriage and a third pair of pins 202 extending through slots in the vertical side portions of the carriage 199. In order to pick up the carriage 199 and guide roller 197 after the sensing operation and move the guide roller 197 out of the way to enable the ejection of the card, a pair of spring-pressed latches 203 are provided, one for each side of the carriage 199 which catch under a flange 204 on the slidably mounted roller carriage when the sensing finger head is fully depressed. As the sensing finger head 5 rises, this latch 203 will carry the roller carriage upwardly with it until an arm 205 on the latch engages a fixed stop 206 on a fixed portion of the apparatus, whereupon the latches 203 are released and the springs 200 snap the roller carriage 199 and roller 197 down into position to guide the next card into position under the sensing fingers.

As shown in Fig. 18, it may be possible to dispense with one of the two sets of selector mechanisms by providing double sets of contacts 10 and 11 on the rotors of the selector devices. With this construction, the extra set of contacts 10 and 11 takes the place of the set of contacts 10 and 11 of the rotors on the lower selector mechanism, thus allowing the entire lower selector mechanism to be dispensed with. This construction requires a somewhat longer apparatus, due to the extra space required for the duplicate sets of contacts on the rotors but avoids a duplication of the sets of gears 12, 124, 150, 153 and 173. A separate set of contacts 18, 19, 21 and 21c must also be provided.

By designing the drive so that the sensing finger head 5 will make a plurality of operations for each step of the selector mechanism, the apparatus may be used for reassembling duplicate, triplicate or quadruplicate sets of cards. When thus designed, it will be seen that each card number will be called a plurality of times: that is to say, if the cards are in duplicate, each card will be called twice; if the cards are in triplicate, each card will be called three times, etc. Thus, no matter in which of the pockets the cards are found, they will all be called and ejected at the proper time. By making one ejection table at a higher level than the other, the order of filing of the duplicate or triplicate cards may be determined.

Figs. 19 and 19a show diagrammatically circuits and apparatus for withdrawing any desired cards from a file of cards by means of suitably perforated master or key cards. In using this apparatus, a set of key cards are provided with perforations corresponding to the perforations in the cards which it is desired to withdraw from the file. The key cards are placed in one pocket 206a and the file cards in another pocket 206b. A key card is fed from the bottom of the pocket 206a of the key cards underneath the sensing finger head 5 and simultaneously a card is fed from the bottom of the stack of cards in the file pocket 206b underneath the sensing finger head 5a for the file cards. If the card from the file corresponds in number to the key card, both cards will be ejected from underneath the sensing fingers, the key card if desired going in one pocket and the file card going into the pocket for cards which it is desired to withdraw. If the file card withdrawn and fed underneath the head 5a does not correspond to the key card withdrawn and fed underneath the key card head 5, the key card will not be ejected but the withdrawn file card will be ejected into a third pocket or receptacle separate from the cards which it is desired to have withdrawn. For this purpose, three ejector relays are provided, ejector relay 207 when actuated serving to eject the key card from underneath the sensing fingers, ejector relay 208 serving when energized to eject the file card into the receptacle for the cards which it is desired to withdraw and the ejector relay 209 serving to eject the file card from underneath the sensing fingers into the receptacle for the cards which it is not desired to have withdrawn. A single conditioning relay 210 serves when energized to establish circuits which will cause the energization of both of the rejecting relays 207 and 208 so that when this conditioning relay is operated, the key card will be ejected into its receptacle and the file card will be ejected into the receptacle for the desired cards. If the conditioning relay 210 is not energized, which will be the case when the file card does not match the key card, a circuit will be established which will energize the ejector relay 209 for ejecting the file card which has just been sensed into the receptacle for the unwanted file cards. Furthermore, if the conditioning relay 210 is not energized, the ejector relay 207 for the key card will not be energized and the key card will remain in position to be sensed again and again until the file card corresponding to it is fed underneath the file card sensing fingers.

The circuit for the ejector for the undesired cards is from the line wire 211 through the conductor 212 to a contact 213 carried by one of the conditioning relay armature levers 214, thence through the contact 215, conductor 216, rotatable contact 217, wiper contact 218, conductor 219, ejector relay 209, and conductor 220 to the other line wire 221. The rotatable contact 217 is mechanically driven in proper timed relation with respect to the drive for the sensing finger heads 5 and 5a, so that each time the sensing heads are operated, the rotatable contact 217 will engage the wiper contact 218 and unless the circuit is broken, as hereinafter described, the ejector relay 209 for undesired cards will be operated to deposit the file card just analyzed into the undesired card receptacle.

In this construction, the anvil bank for the file card is similar to the construction of the anvil bank described in connection with Fig. 1, being made up of anvils 6, a single anvil serving for all of the sensing fingers of the same order, but the anvil bank for the key card analyzer must be made up of individual anvils 6a, one for each of the sensing fingers of the key card analyzer, these individual anvils being connected by suitable conductors 222 with the corresponding sensing finger contacts of the file card analyzer. With this construction, assuming that the file card being analyzed matches the key card being analyzed, the circuit will be from the line wire 221, through the conductor 223, conditioning relay 210, conductor 224, units anvil 6 of the file card analyzer, one of the units sensing fingers of the file card analyzer, conductor 222 connected therewith to the corresponding individual anvil 6a of the key card analyzer, thence through the matching contact finger of the key card analyzer, conductor 225, tens anvil of the file card analyzer, one of the sensing fingers of the file card analyzer, one of the conductors 222 to the individual tens anvil of the key card anvil, corresponding sensing finger of the key card analyzer, conductor 226 to the hundreds anvil of the file card analyzer, one of the sensing fingers of the file card analyzer, one of the conductors 222 to the corresponding individual anvil of the key card analyzer, and so on in series through each order of the file card analyzer and key card analyzer to the conductor 227 leading to the other side of the circuit 211.

In the case where the file card being analyzed does not correspond to the key card being analyzed, the circuit through the conditioning relay will not be completed. If we assume, for example, that the key card being analyzed is No. 4,441 and that the file card being analyzed is No. 4,434, the circuit will be broken in the tens anvil bank of the key card analyzer. The circuit up to the break will be from the line 221 through the conductor 223, conditioning relay 210, units anvil bank of the file card analyzer, No. 4 sensing finger in the units column, through the conductor to the No. 4 anvil in the units column of the key card analyzer, through the No. 4 sensing finger in the units column of the key card analyzer, conductor to the tens anvil of the file card analyzer, through the No. 3 sensing finger in the tens column of the file card sensing fingers, through one of the conductors 222 to the No. 3 anvil in the tens anvil bank of the key card analyzer where the circuit is broken because there is no perforation in the key card which will permit the No. 3 finger in the tens column of the key card analyzer to engage the No. 3 anvil in the tens column of the key card analyzer.

Thus, as indicated above, if there is correspondence between the key card and file card, the conditioning relay 210 is operated, breaking the circuit for the relay 209 which, if energized, would cause the ejection of the file card into the undesired card receptacle and causing the energization of the ejection relays 207 and 208, which will cause the ejection of the key card just analyzed and will cause the ejection of the analyzed file card into the receptacle for desired cards.

The construction and operation of the conditioning relay and associated parts is substantially the same as that described in connection with Fig. 1 except that the relay 210 is provided with two armature levers, one for each of the ejector relays 207 and 208. The two ejector relay mechanisms are quite similar except that the armature lever 214 which controls the file card ejector relay 208 co-operates with the contact 215 in the undesired ejector circuit.

Referring first to the ejector relay mechanism for the file card, this comprises an ejector lever 228 for operating the ejector mechanism, pivotally mounted at 229, provided with a return spring 230 and having a detent finger 231 co-operating with a latch finger 232 on the armature lever 233 of the conditioning relay 210, a spring-pressed lever 234, pivoted at 235 and having a notch 236 for latching engagement with a finger 237 on the conditioning relay armature lever 233 when the conditioning relay 210 is energized, this latching lever 234 having a finger 238 which is engaged by the finger 231 on the ejector lever 228 when the ejector magnet 208 is energized, thereby releasing the armature lever 233 of the conditioning relay and the double-acting contact 213 carried by the armature lever 233 and engageable alternatively with the contacts 215 and 239. The ejection relay and associated parts for the key card ejector are similar to the construction just described, except that here of course there is no equivalent contact for the contact 215.

As previously indicated, when the conditioning relay 210 is energized, it will cause the energization of the ejector relays 207, 208 and the consequent ejection of the key card and file card as described. The circuit established for the ejector relay 208 is from the line wire 211 through the conductor 212, contacts 213 and 239 of the conductor 240, circuit closer 17 controlled by the sensing head 5a, conductor 241, ejector relay 208 and conductor 242 to the other line wire 221.

The circuit for the ejector magnet 207 is from a line wire 211 through the conductor 243, circuit closer 17 controlled by the sensing head 5, conductor 244, contacts 239 and 213, conductor 245, ejector relay 207, and conductor 246 to the other line wire 221. When the armature lever 233 is caused to move, it causes the contact 213 to disengage the contact 215 and engage the contact 239. It also causes the finger 232 to move out from underneath the finger 231 to free the armature ejector lever 228 from movement. It also causes the finger 237 to engage in the notch 236 of the lever 234. When the sensing head 5a in its movement closes the contacts at 17, the relay 208 is energized, causing movement of the ejector lever 228 to eject the file card into the desired card receptacle. This movement of the ejector lever 228 causes the finger 231 to engage the finger 238 of the lever 234, thus releasing the finger 237 from engagement with the notch 236 and allowing the armature lever 233 to return.

A similar operation takes place with respect to the relay mechanism for the key card ejector relay 207.

In order to make sure that a circuit is completed when it should be, means must be provided for automatically connecting the line 211 with the anvil bank corresponding to the highest order of the number of the key card being analyzed. It is also desirable to provide means whereby if the number of the file card being analyzed is of a higher order than the number of the key card being analyzed, this fact will be made known to the operator, as this would ordinarily mean that a card had been misplaced in the file card pocket. For this purpose, the construction shown in Fig. 19a is provided.

This comprises the rotatably mounted contact finger 247 connected with the line 211 cooperating with a circular series of contacts 248 connected, respectively, with the sensing fingers 5 of the different orders, as shown in Fig. 19. Means are provided so that as a key card is fed out from the pocket 206a underneath the sensing fingers, it will cause impulses to be given to the electromagnet 249, the armature lever 250 of which carries a pawl 251 which drives a ratchet-wheel 252 on the shaft 253 of the rotatable contact finger 247. The circuit for this electromagnet is controlled by a plurality of contact fingers 254, one for each digit line of the key card, co-operating with an anvil 255 underneath the card. As the card travels underneath the contact fingers 254, if there is a perforation in the units column an impulse will be given to the electromagnet 249 which will advance the contact finger 247 one step. If there is a perforation in the tens column, the contact finger 247 will be advanced another step, and so on, so that the contact finger 247 will be left in engagement with a contact corresponding to the highest order of the number of the key card. In order to hold the contact fingers 254 out of possible engagement with the anvil 255, except during that part of the card travel in which the number field is underneath the contact fingers, a lifter cam 256 is provided which is automatically actuated in proper timed relation to lift all of the contact fingers 254 away from the anvil except during that part of the card travel in which the number field is underneath the sensing fingers.

The circuit for the electromagnet 249 is from one side of the line 257 through the electromagnet 249, conductor 258, contact finger 254, anvil 255, and conductor 259 to the other line 260. In order to restore the contact finger to initial position when the key card is ejected, a release magnet 261 is placed in multiple with the key card ejector magnet 207, which magnet, when energized, will cause the armature lever 262 to actuate the push link 263 to release both the actuating pawl 251 and the retaining pawl 264, which control the ratchet wheel. This enables the torsion return spring 265 to return the contact finger 247 to initial position, which is determined by the engagement of the shoulder 266 on the small cam with a fixed stop 267.

As indicated above, it may be desirable to provide indicating means for showing the relation between the orders of the numbers of the key card and file card being simultaneously analyzed. For this purpose, the file card side also may be provided with a ratchet wheel 268 and drive therefor controlled by contact fingers 269 similar to the ratchet drive and contact finger control for the key card side. The driven ratchet wheel 268 is mounted on a shaft 270 which carries a snail cam 271 similar to the snail cam 272 on the shaft 253 on the key card side. A stop 273 and return spring 274 are provided similar to the stop 267 and return spring 265 on the key card side. A release magnet also is provided similar to the release magnet 261 on the key card side.

The two snail cams control a floating bar 275 carrying a pair of contacts 276 and 277, both electrically connected with the conductor 259 for controlling the signal devices. It will be noted that the farther the snail cams 271 and 272 are rotated clockwise, as viewed in Fig. 19a, the higher the lifting pins 278 and 279 which pivotally support the floating bar 275 will be raised. If the file card end of the floating bar 275 is higher than the key card end, the contact 276 on the floating bar will engage the contact 280. If the key card end of the floating bar 275 is higher than the file card end of the floating bar, the contact 277 on the floating bar will be moved into engagement with the contact 281. The floating bar is guided in its floating movement by a crosshead 282 mounted in vertical crosshead guides 283 on the bracket 284 in which the lifting pins are slidably mounted. If the highest order of the file card 285 being analyzed is higher than the highest order of the key card 286 being analyzed, the file card end of the floating bar will be higher than the key card end, and vice versa. If the file card end of the floating bar is higher than the key card end and the contact 276 is moved into engagement with the contact 280, a circuit will be established which may cause the red signal 287 to be displayed, indicating that an unusual condition exists, an audible signal 288 may be sounded and a stop magnet 289 may be energized, which will break the main power line for the apparatus and stop its operation, thus giving the operator a chance to investigate and determine whether anything is out of order. If the key card end of the floating bar 275 is higher than the file card end, the contact 277 is moved into engagement with the contact 281 and a circuit will be established through the green signal light 290. This does not necessarily indicate that an unusual situation exists, although it does indicate that the number of the key card being ana'yzed is of a higher order than the number of the file card being analyzed. If both ends of the floating bar are at the same height, it will indicate that the order of the number of the key card being analyzed is the same as the order of the number of the file card being analyzed and no signal will be displayed or made. The circuit controlled by the contacts 276 and 280 is from the conductor 259, through the contacts 276 and 280, conductor 291 and through parallel circuits 292, 293, and 294 for the red signal light, audible signal, and the stop magnet respectively. The circuit controlled by the contacts 277 and 281 is from the conductor 259, through the contacts 277 and 281, conductor 295, green signal light 290 and the conductor 296 to the line 257.

Figure 20:
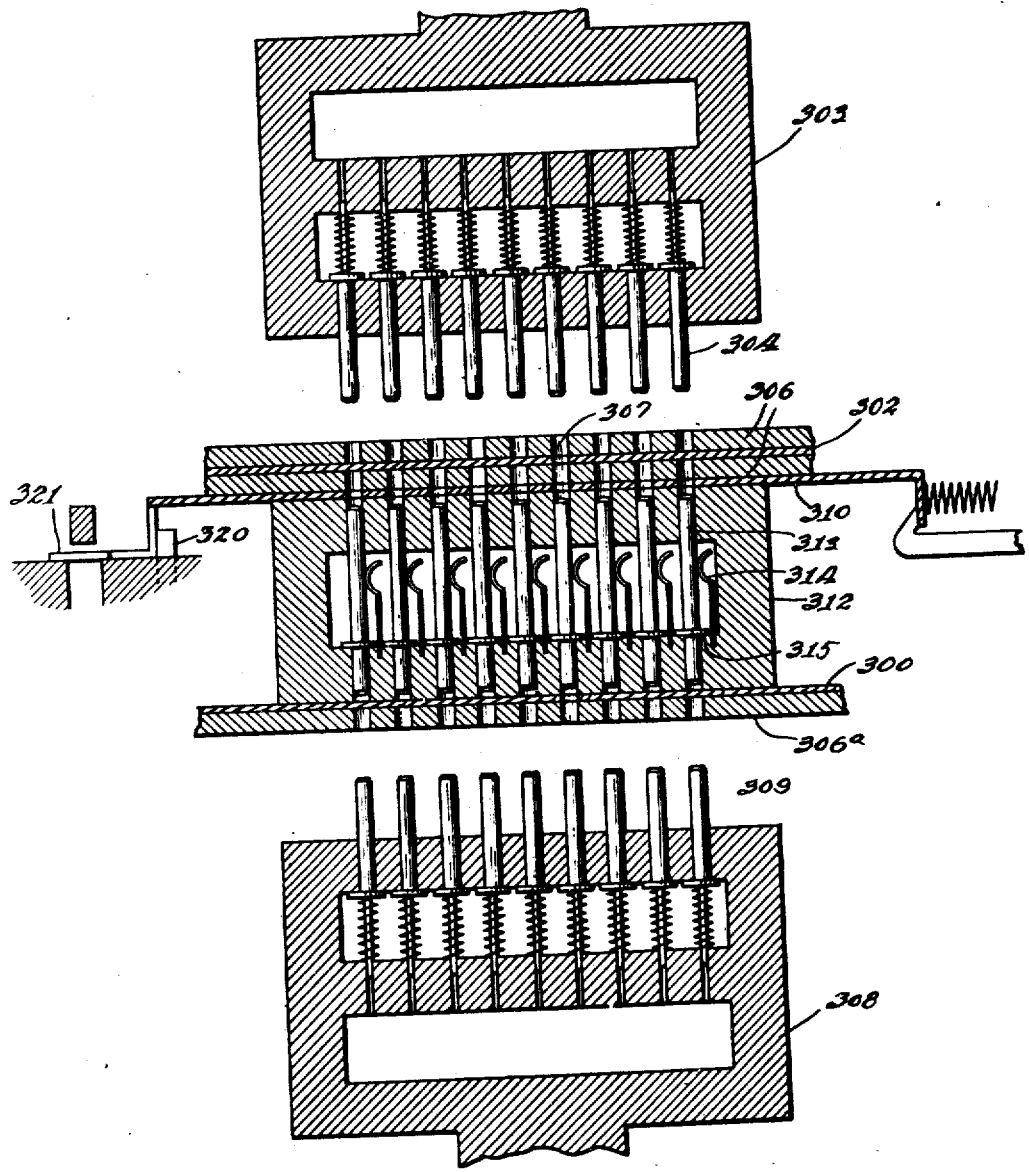
Fig. 20 illustrates an embodiment of my invention in which the sensing is accomplished and record selection obtained mechanically.

Figs. 20 to 22, inclusive, illustrate an embodiment of the invention in which filing is accomplished by the use of so-called master cards, and matching and withdrawing may also be accomplished by using one side only of the device with the most complete set of cards used as master cards and ejecting all cards into a common pocket.

For filing, the file cards are in two separate stacks, and cards from each stack are sensed substantially simultaneously with the master cards, which latter are inserted into the sensing device and discharged therefrom consecutively.

The arrangement of the stacks of file cards and stacks of master cards and the movement of the cards during the operation of the machine are illustrated diagrammatically in Fig. 22, the file cards being moved from the stacks 300 by suitable ejectors in the direction of the arrows, to be finally deposited in a common container 301. That is, the file cards are first moved by suitable ejectors to the dotted-line position, where they are sensed, and then ejected to the common container 301. They are only moved from the dotted-line position when they match with a master card which is superposed thereover. The master cards 302 are consecutively ejected from the master card stacks and moved to the dotted-line position to enable the file cards to be matched therewith, and are then ejected to the full-line position 302a.

The sensing mechanism is illustrated in Figs. 20 and 21, and comprises upper and lower movable sensing heads. The upper head 303 is provided with spring-pressed sensing pins 304 and the lower head is provided with similar sensing pins and will be described later. Although only a single row of pins is illustrated in each head, it will be understood that any desired number of rows may be provided, as previously described.

The master cards 302 are in numerical order and should represent a complete numerical sequence corresponding to the serial numbers of the designations carried by the groups of file cards, so that they will establish definite series of operations to which the file cards in the respective groups will respond when their designating numbers are in agreement and are consecutively inserted in a suitable card support which may comprise the usual card-holding member 306, so that any holes in the master card will be in alignment with sensing holes 307 in the card support. It will, therefore, be apparent that during the downward movement of the sensing head the pins 304 will pass into the holes 307 and through any corresponding holes in the cards.

The file cards 300 are supported on a suitable member 306a, with the holes in the cards in alignment with the holes in the master card. A movable sensing head 308 is positioned below the file card and provided with spring-pressed sensing pins 309, which may be similar to the pins 304, so that when the sensing head 308 is raised, any pins corresponding to holes in the file card will pass therethrough.

A slidable plate 310 is provided with holes 311, and these holes are arranged to normally be in alignment with the holes in both the master card and the file card. An intermediate support 312 is provided between the plate and the file card being sensed, and this support is provided with movable lock pins 313 corresponding in number to the holes in the plate 310. These pins are normally frictionally held in the position illustrated by means of springs 314 and it will be apparent that when any of the pins 313 are raised sufficiently to extend through corresponding holes in the plate 310, the plate will be locked in position by engagement with the pin or pins. These pins are provided with stops 315 to limit their downward movement.

The lower sensing head 308 operates slightly ahead of the sensing head 303, whereby lower pins 309 first pass through any aligned holes in the file card 300. Each pin which passes through a corresponding hole pushes a corresponding lock pin 313 upwardly through a hole in the plate 310. The lower head 308 is then withdrawn and the upper head 303 moved downwardly and the pins 304 will then pass through any corresponding holes in the master card and will push the corresponding raised lock pins 313 downwardly to the position illustrated, and thereby enable the plate 310 to be moved after the sensing pins are withdrawn, if the file card matches the master card.

As previously described, the master cards are inserted into and ejected from the sensing mechanism in consecutive numerical order and the file cards are also in numerical order, although not a complete sequence. Therefore if the file card 300 matches the master card and the locking pins are all returned to the position illustrated, the plate 310 may then be moved to the left to cause the operation of an ejector for ejecting the file card.

The plate 310 is moved during the normal operation of the machine by the mechanism illustrated in Fig. 21. A cam 316, driven from any suitable part of the operating mechanism, moves a lever 317 after each sensing operation. If the file card matches the master card, there will be no locking pins extending through the plate 310, and the plate will be moved to the left by the lever 317 operating against a spring 318, which latter is of sufficient strength to cause the movement of the plate, and sufficiently compressible to permit movement of the operating lever 317 if the plate is locked. The plate is normally held in the position illustrated by means of a spring-pressed slide 319, which normally maintains the downwardly extending portion of the opposite end of the plate against a stop 320. If the plate is locked, the lever 317 and slide 319 are still free to move by compressing the spring 318.

The opposite end of the plate is provided with an outwardly extending portion 321, which is arranged to normally close a slot 322 in any suitable fixed portion of the device. A rock shaft 323 is provided with an arm 324 having its outer end positioned immediately over the slot 322, whereby when the plate 310 is locked by the pins 313, the lever 324 is also locked against downward movement. The rock shaft 323 is also provided with an arm 325, which is so positioned relative to the rearwardly extending arm of lever 48 of the ejecting device illustrated in Fig. 1 that the downward movement of this arm 325 will cause the hook 47 to be disengaged from the latch 31 on the actuating lever 32 of the ejecting mechanism.

In order to operate the rock shaft 323, an arm 326 is oscillatively mounted on the shaft by means of a spring 327. A cam 328, which is driven by any suitable part of the mechanism is rotated after every sensing operation. Therefore, if the file card matches the master card, the plate 310 will move to the left and the portion 321, which normally covers the slot 322, will be moved to uncover this slot and the operation of the cam 328 will then cause the ejecting mechanism to be operated in the manner described. Any suitable ejecting mechanism may of course be used for the master cards and the file cards, the ejecting mechanism for the master cards operating after each sensing operation, and the ejecting mechanism for the file cards being intermittently operated as described. It will of course be understood that the ejecting mechanisms discharge a card and substantially simultaneously insert another card for a subsequent sensing operation.

It will also be understood that in accordance with the diagram illustrated in Fig. 22, two of these sensing and ejecting mechanisms will be provided, one for each stack of file cards and corresponding master cards, so that the file cards of the two stacks will be in numerical order in the common receptacle after being sensed, although not necessarily in complete consecutive numerical order. While master cards are used for the purpose of illustration, any other means might be employed which would establish the same definite series of operations comparable to operations required to translate the perforated operating positions of cards representing a complete numerical sequence; that is, metal slugs in series of ten for each order of a number, etc.

The matching of cards may be accomplished by the embodiment illustrated in Figs. 20 to 22, inclusive, by using one side only of the device and placing the most complete set of file cards in place of the master cards.

Withdrawing also may be accomplished by using only one side with file cards in place of the master cards and the key cards in place of the file cards.

When it is desired to match cards by means of the mechanism just described, stacks of opposing groups of cards are placed in a position to be fed into the upper and lower positions illustrated in Fig. 20. A stack of cards representing the most complete set is positioned so that the cards may be fed consecutively into the upper or master card position illustrated and the upper and lower cards are arranged to be ejected into a common receiving pocket. If a card in the lower position matches with the card in the upper position, the lower ejector is caused to operate by means of the mechanism illustrated in Fig. 21. Means is provided whereby the operation of the mechanism for ejecting the lower card prevents the ejection of the upper card so as to hold the upper card in position for another analysis with the succeeding lower card. In other words, the upper card remains in the sensing device until a card of different designation is received on the lower analysis plate, thereby permitting the upper card to eject and the mechanism to continue to eject upper cards until the lower card again matches.

The upper card ejector may be electrically operated and, in order to prevent operation thereof when the lower card is to be ejected, a two way switch 329 may be inserted in the ejector control circuit 330. An auxiliary switch comprising normally closed contact members 331 and 332 may be arranged in parallel with the circuit 330 so that, when it is desired to operate the machine to match cards, the switch 329 may be moved to bring the auxiliary switch in series in the control circuit. When the switch 329 is in this series position, the operation of the arm 324 to cause the ejection of the lower card will engage the contact member 331 and temporarily open the auxiliary switch and thereby prevent the operation of the upper card ejector. If, however, the lower card does not match the upper one, the mechanism shown in Fig. 21 will not be operated and the circuit of the upper ejector will not be broken and the ejector will, therefore, continue to operate to eject the upper cards consecutively until a lower card again matches.

Figs. 23 and 24 illustrate an electrical control device for accomplishing the same result as the embodiments shown in Figs. 1 to 19, inclusive. In the embodiment of Figs. 23 and 24, master cards are not used and filing or matching may be accomplished from two stacks of file cards in a manner similar to that previously described.

Two sets of ejector mechanisms 333 and 334 of the usual type are provided for moving the cards from the stacks to the final container. Any suitable electrically controlled ejector mechanisms may be provided and wired in parallel in a circuit comprising a power source, such as a battery 335, a common conductor 336, and individual conductors 337 and 338. A double acting relay 339 may be provided with its armature connected to the opposite pole of the battery 335, whereby, when one magnet or solenoid 340 thereof is energized, a secondary circuit will be closed to operate the ejector 334 and, when the opposite magnet or solenoid 341 is energized, a circuit will be connected whereby the opposite ejector 333 will be operated.

Each of the solenoids 340 and 341 of the relay is arranged to move an armature 342 in a direction to connect the respective secondary circuit, and this armature will be retained in its respective circuit connecting position by means of one of the latches 343 until it is released by the operation of the associated ejector. Each ejector is provided with a movable arm 344 which, when moved by the operation of the ejector, engages its respective latch 343 and releases the armature 342 whereby it may be again operated.

In this embodiment, each sensing mechanism may comprise the usual electrical sensing head and associated parts wherein all of the contactors in one of the upper sensing heads 345 are electrically connected to a common conductor 346 in series with the magnet 340 of the relay and the lower sensing contacts are provided with individual electrical conductors 347 which are connected to a row of individual terminals 348. The opposite upper sensing head 349 is also provided with similar contactors which are all electrically connected to a conductor 350 in series with the magnet 341 of the relay, and the lower contacts are electrically connected to a similar row of terminals 351 by means of individual conductors 352. By means of this arrangement, whenever the sensing heads 345 and 349, which may be operated substantially simultaneously, are moved downwardly, any contactors which extend through holes in the cards will cause the associated magnet 340 or 341 in the relay to be connected to a corresponding terminal.

The terminals 348 and 351 are preferably arranged in two or more parallel rows around a shaft 353 as illustrated in Fig. 24. This shaft may be constantly driven from any suitable part of the mechanism and may be provided with a friction clutch 354, the driven member of which is normally held against rotation by means of a latch 355 engaging a pin 356 on the driven member. The clutch may be normally held in stop position, as illustrated, by means of a spring 357. A magnet or solenoid 358 may be provided for operating the latch 355 to release the driven member of the clutch 354. This magnet may be energized from any suitable power source by means of a suitable switch operated by the downward movement of the sensing heads. A contact arm 359 is mounted on the driven member of the clutch 354 and insulated therefrom by means of an insulator 360, and a collector ring 361 is also supported on the insulating member and provides a constant electrical connection between the contact arm 359 and a spring contact 362 in series with a conductor 363. The conductor 363 is in series with each of the relay solenoids 340 and 341 through a battery or other suitable power source 364. Each time that the sensing heads operate, an electrical connection is made by a suitable switch whereby the clutch solenoid 358 controlling the latch will be operated and the contact arm 359 will make one revolution and then be stopped by the latch. During this revolution, the contact arm 359 wipes over all of the terminals 348 and 351.

Each row of terminals corresponds to the operating positions of the cards, and as the operating positions on the most commonly used cards are usually in columns of tens, each series of ten terminals in a row represents one column of spaces on a card. For example, if nine columns are to be sensed in two groups of cards there would be two rows of terminals, each row consisting of ninety terminals, and the contact arm 359 would make a wiping electrical connection with all of these terminals in both rows during a single revolution. That is, it would wipe over both rows simultaneously.

One object of the present arrangement is to always eject the lowest card from its respective sensing device for the purpose of filing. Therefore, if two cards are in sensing position, as illustrated by dotted lines X and Y, respectively, and the sensing heads are moved downwardly, not more than one contactor in each column will make contact therethrough. For instance, if a connection is made with the conductor A through the sensing head 348, its corresponding terminal A' will be energized; and if, substantially simultaneously, the conductor B on the opposite side is connected through its sensing device 349, it will provide an electrical connection to the terminal B'. If, then, the arm 359 is rotated to wipe over the two rows of terminals 348 and 351, the first circuit made will be through the terminal A'. The circuit will then be completed from the battery 364 through A', conductor A, conductor 346, and relay solenoid 340, and return to the battery. The armature 342 will immediately be moved to the right and locked by latch 343, so that the secondary circuit connection from the battery 335 will be made through the ejector 334 to cause the ejector operation. The operation of this ejector will then eject the low card Y, and simultaneously the arm 344 of the ejector will trip the latch 343 and re-set the relay in the manner previously described.

In other words, the first terminal contacted by the arm 359 will always correspond to the numerically highest of the two cards being analyzed and will, therefore, cause ejection of the opposite card, which is necessarily the numerically lower card. The rows of terminals 348 and 351 are preferably arranged in nine-to-naught series relation corresponding to the possible perforations of each column of the cards being analyzed and the contactor 359 moves over all of the terminals from nine to naught of each series.

In case two opposite terminals are simultaneously energized, that is, each corresponding to the same digit in corresponding rows of both cards, the magnets 340 and 341 will be neutralized and the relay will not operate until the contactor 359 reaches a series in which different terminals are energized. The first energized terminal contacted in that series by the arm 359 will then cause the ejection of the opposite card.

When it is desired to match cards by means of the device just described, opposing groups of cards are placed in position to be fed into the sensing heads, as indicated at X and Y. A stack of cards representing the most complete set is positioned to be fed into the sensing head Y and the other stack of cards positioned to feed into the opposite sensing head X. If the card in the sensing head X matches the card in the sensing head Y, oppositely aligned terminals in the rows would always be energized during the rotation of the contact arm 359, and, therefore, no card would be ejected by contact with these terminals.

In order to match cards, therefore, some method must be provided whereby a Y card will be ejected after all matching X cards are ejected. This is accomplished by means of an additional terminal 365 connected in series with the relay solenoid 341, whereby, when the cards match and the contact 359 wipes over this additional terminal, the relay will be energized to operate the ejector 333 and eject the file card X. This operation will continue as long as the card X matches the key card Y. However, as soon as the matched cards X are all ejected, the first terminal contacted at the next operation will be one of the terminals 348. This is true because the next highest card sensed will be an X-card, all matching X-cards having already been ejected. This higher X-card will cause the ejection of the first maching key card Y, and these cards Y will continue to be ejected until the cards again match or become higher than the X card to again eject the X cards. It will be apparent that, when the cards do not match, the relay 339 will be operated to eject the non-corresponding low card before the terminal 365 is reached and the contact of the arm therewith will not cause a further operation of the device.

In the claims where the words "numerical" or "number" are used, they are to be understood as broad enough in meaning to be applicable to any designating series, such as an alphabetical series, or the like.

Further modifications will be apparent to those skilled in the art and it is desired, therefore, that the invention be limited only by the prior art and the scope of the appended claims.

Having thus described my invention, what I claim and desire to secure by Letters Patent is:

1. A record-controlled electrical apparatus for determining the comparative value of numbers in a plurality of predetermined record fields, comprising open circuits corresponding to each possible digit position and value as indicated on its respective record automatically established, means for selecting and partially completing circuits in accordance with digits predetermined by each record and value differentiating, means to serially close said selected circuits in accordance with the relative value of each digit of each field, and mechanism controlling means, said mechanism controlling means and said circuit-closing means being constructed and arranged to prevent operation of said mechanism controlling means when circuits of corresponding digits in each field are closed and to cause operation when the first individual circuit in a predetermined sequence value is closed.

2. An apparatus designed to be controlled by records having operating positions capable of being rendered effective to designate the sequential position of each record in a series in which the records are to be placed, comprising a common receiving magazine for said series, a plurality of distributing magazines into which the records to be merged into said series are placed; means for comparing the operativeness of corresponding operating positions in a designated field of a record from each distributing magazine, one order at a time, said comparison beginning with the highest orders of the compared fields and the highest character designating positions of such orders and progressing successively to the lowest positions of the lowest orders of the compared fields; selectable means for feeding the records one at a time from the distributing magazine for comparison of a record from each distributing magazine with a record from another distributing magazine, and means selected by the comparing means for selecting one of the feeding means to feed to the common receiving magazine a predetermined one of the compared records when said compared records are not in agreement.

3. In a machine designed to be controlled by records, which records have operating positions capable of being made to express a designating series, with certain operating positions made operable to express definite designations, apparatus for determining, for the purpose of selection, the comparative sequential value of designations in two or more opposed designating fields of said records, said apparatus comprising means for establishing an open electromagnetic circuit representative of each operating position of each designating field of the records under analysis, terminal switches placed in each circuit in series to correspond with the operating positions of each designating field, brushes designed to close those circuits representative of operating positions which have been made operative, said brushes being moved in parallel relation across the opposing terminals, said circuits being designed to nullify the operation of selective means when closed in corresponding operating positions of the opposed designating fields, and to become effective for selecting when closed in one designating field only.

4. In a machine designed to be controlled by a plurality of groups of control cards, which cards have operating positions capable of being made to express the elements of a designating series, with certain positions in the designating fields of the cards made operable to correspond with the designations of records represented, said groups of cards arranged in serial order according to their serial designations, the cards in each group containing cards of duplicate designation to those in opposing groups; the combination of a card receiving magazine, means for ejecting said cards into said receiving magazine; means for comparing the operating positions of a card from each group and capable of detecting which of the compared cards is highest or lowest in said series and also capable of detecting duplicates among the compared cards, said comparing means controlling the ejecting means to cause the disagreeing compared records to be ejected into the receiving means according to which of the compared records is highest or lowest; and means controlled by the comparing means for preventing the ejecting mechanism from ejecting cards from one group until all cards from opposing groups, duplicating the record designations of cards under analysis in the one group have been ejected, said comparing means being effective regardless of whether one or all of the columns of said fields contain designations, and regardless of whether the elements designating the sequential position of a record are represented by independent operating positions or combinations of positions.

5. In a machine designed to be controlled by a plurality of groups of control cards, which cards have operating positions capable of being made to express a designating series, with certain operating positions in the designating fields of said cards made operable to express definite designations, which cards are arranged in each group in serial order according to record designations, the cards of each group containing cards of duplicate designation to those in opposing groups; the combination of means for comparing the operating positions of a record from each group and capable of denoting the relative sequential position of the compared records or their identity, means controlled by the comparing means for ejecting said cards to a common destination in the order of said series, and means for preventing said ejecting means from ejecting the series of one group until duplicate cards in an opposing group have been ejected according to the precedence in which it is desired to file them, said comparing means being made effective as a result of comparing the operating positions in opposed designating fields whether or not all of the columns of said fields contain a designation, and regardless of how many designations occur in the respective columns.

6. In a machine controlled by groups of records, each record having a plurality of record designation areas, each of which areas contains a plurality of operating positions, one or more of which positions may be made operative in an area to represent one of the elements of a group identifying the record and denoting the sequential position of said record in a series or order in which the records are to be fed, the sequential position of each record being identified by a group of sequence designating elements consisting of several areas in which one or more positions have been made operative; means to feed the records of each group, record sensing means having means to close a circuit for each operating position made operative in a record from each group, record comparing means including a series of terminals connected to the circuit closing means and representing all of the operating positions of all of the records sensed, said comparing means also including switching means cooperating with said terminals to close circuits to the first circuit closing means denoting the relative sequential order of the records compared, and electromagnetic means in said circuits for selectively controlling the feeding means according to the sequential relation of the compared records whereby to cause the records to be fed in the order of said series.

7. In a machine controlled by records, each record having a plurality of areas provided with a plurality of operating positions capable of being made operative to represent one element of a plurality of elements identifying such record and denoting its sequential position in a series or order in which the records are to be arranged, one or more of said areas in each record having at least one of its operating positions made operable to represent the several elements of a group designating the sequential position of such record, said records initially being divided into two separate groups to be merged into a single series in accordance with the operating positions made operable; a pair of record feeding devices, one for each of said groups, a pair of record sensing devices, each for sensing the operating positions of a record from one of said groups, each sensing device having a circuit closing element for each operating position, each circuit closing element being rendered effective to close a circuit when the corresponding operating position of a sensed record has been made operable, a pair of relay coils for selectively controlling the operation of the feeding means, and means to close circuits through one or the other of said relays and through the circuit closing elements of the sensing devices according to the sequential positions of a pair of records sensed by said devices.

8. In a machine controlled by records, each record having a plurality of areas provided with a plurality of operating positions capable of being made operative to represent one element of a plurality of elements identifying such record and denoting its sequential position in a series or order in which the records are to be arranged, one or more of said areas in each record having at least one of its operating positions made operable to represent the several elements of a group designating the sequential position of such record, said records initially being divided into two separate groups to be merged into a single series in accordance with the operating positions made operable; a pair of record feeding devices, one for each of said groups; a pair of record analyzing devices, each for analyzing the operating positions of a record from one of said groups, each analyzing device including a circuit closing element corresponding to each operating position, each circuit closing element being rendered effective to close a circuit when the corresponding operating position of a sensed record has been made operable, a pair of relay coils for selectively controlling the operation of the feeding means, and sequence determining means including means to selectively close circuits to said relays through said circuit closing elements according to the sequential relationship of the records analyzed.

9. A data comparing machine for records of the character described comprising means for consecutively sensing opposed groups of records, means controlled by said sensing means for partially establishing an electric circuit corresponding to each ordinal in each opposed record being sensed, means to energize all of said partially established circuits and means controlled by at least one of said energized circuits to select a record having a value nearest a predetermined value extreme.

10. Apparatus for combining groups of cards, which cards have perforations corresponding to serial designations, said perforations appearing only in those columns of a designating field in which a designation is required for its record value and in which the cards of one group may comprise cards having designations complemental to designations in cards of another group and may comprise other cards having designations which are duplicates of the designations of the cards in said other group, said apparatus comprising means for withdrawing cards from said groups, reading means comprising an independent reading position for each digit in an 0 to 9 series effective in reading out a numerical series expressed throughout by single digit designations as well as in reading out a series expressed through combined designations, comparing means to which said readings are communicated, value differentiating selective means cooperating with said comparing means and operable to select from the cards under comparison a card of predetermined value extreme, and alternate selective means for controlling the disposition of the duplicate cards.

11. In a machine of the class described, a plurality of magazines for receiving records bearing sequence designations disposed in the index-point positions of columns or areas in a field of each record allocated to denoting the sequential position of each record in a series or order into which the records are to be merged; means to compare the sequence designations in a record from one magazine with the designations in a record from at least one other magazine, said comparing means commencing comparison of each record with a terminal index point position of one column of said field and progressing successively through the remaining positions of said column and passing to all other columns of said field to a terminal index-point position of another column of said field and responsive to any designations in any column of the records compared, and selective means controlled by the first designation encountered during said comparison for determining the disposition of the compared record having said first designation.

12. In a machine controlled by a plurality of separate groups of records, each record of a group having a plurality of record designation areas, each of which areas contains a plurality of operating positions, one or more of which positions may be made operative in an area to represent one of the elements of a group of insignia identifying the record and denoting the sequental position of the record in a common series or order which the records in said groups follow in respect to their designations, each record being identified by a group of sequence designating elements consisting of areas in which one or more of the operating positions have been made operative; record analyzing means including a record analyzing device for analyzing a record from each group, each device including means controlled by the record analyzed by such device for initially closing a circuit for all possible operating positions made operable in an area of the record analyzed and including a supplemental circuit closing device for successively closing said circuits in a prearranged order beginning with a predetermined position in a predetermined area and progressing successively to close the circuits for all said positions in said area and ending with a predetermined position of another area of the record analyzed; and machine control means selectively rendered operative when a circuit is completed through one of the circuit closing means for an operating position made operative in one of the records analyzed.

13. In a machine controlled by groups of records, each record having a plurality of record designation areas, each of which contains a plurality of operating positions, one or more of which positions may be made operative in an area to represent one of the elements of a group of insignia identifying the record and denoting the sequential position of the record in a series or order which the records follow in respect to their designations, each record being identified by a group of sequence designating elements consisting of areas in which one or more of the operating positions have been made operative; means to feed a plurality of groups of said records for comparison of a record from each group with a record from another group, said feeding means being selectively controllable to determine from which group a record is to be fed; record analyzing means including, for each record group, contact operating means for each operating position in each area, each contact operating means being rendered effective when the corresponding operating position of a record analyzed has been made operative; means for testing the condition of the contact operating means, said testing means commencing testing with the operating positions corresponding to a predetermined extreme of sequential position and proceeding to test successively all the operating positions corresponding to intermediate sequential positions and terminating with the operating position corresponding to the opposite extreme of sequential position; and electromagnetic means controlled by the testing means for selecting one of the feeding mechanisms for operation when the testing means first detects an operating position made operative as represented by the operative condition of the corresponding contact operating means.

14. In a machine controlled by records each of which is identified by designations in columns of index-point positions, one or more of which columns in each record having one or more designations forming an element of a group of elements consisting of insignia identifying such record; means to sense together a plurality of said records including circuit closing means, one for each index-point position in each column of each of the records sensed; a plurality of selectable ejection means, one for each record sensed, and including an electromagnetic circuit for causing the ejection of such record; and means to open and close selectively the electromagnetic circuits through such of the circuit closing means as correspond to designated index point positions, said selective circuit closing means controlling the opening and closing of said magnetic circuits according to the sequential positions of the records sensed to cause the ejection of the records in a predetermined sequence.

15. In a machine controlled by records each of which is identified by designations in columns of index-point positions, one or more of said columns in each card having one or more designations representing an element of a group of elements identifying such record; means to sense a plurality of records including circuit closing means, one for each index point position in each column of each of the records sensed; a plurality of selectable ejection means, one for each record sensed, and including an electromagnetic circuit for causing the ejection of such record; means to open and close selectively the electromagnetic circuits through such of the circuit closing means as correspond to designated index-point positions, said selective circuit opening and closing means controlling the opening and closing of said circuits according to the sequential positions of the records sensed to cause the ejection of the records in a predetermined sequence; and supplemental circuit closing means for closing a predetermined one of said circuits when a pair of sensed records is identically designated to cause a predetermined one of the identically designated records to be ejected ahead of the other.

16. In a machine controlled by records each of which is identified by designations in columns of index-point positions, one or more of said columns in each card having one or more designations representing an element of a group of elements identifying such record; means to sense together a plurality of records including circuit closing means, one for each index-point position in each column of each of the records sensed; a plurality of selectable ejection means, one for each record sensed, and including an electromagnetic circuit for causing the ejection of such record; and means to open and close selectively the electromagnetic circuits through such of the circuit closing means as correspond to designated index-point positions, said selective circuit opening and closing means controlling the opening and closing of said circuits according to the sequential positions of the records sensed to cause the ejection of the records in a predetermined sequence, said selective circuit opening and closing means also being arranged to close a predetermined one of said circuits when a plurality of sensed cards are identically designated to cause a predetermined one of the sensed records to be ejected ahead of another.

17. In a machine of the class described; means to analyze a plurality of records at a time, each record having columns of index-point positions, one or more of which positions may be made operative to express an element of a combination of elements denoting the sequential position of the record in a series or order, said analyzing means including contact means, one for each position, rendered operative and inoperative by making the corresponding operating position of a record operative; a plurality of machine control electromagnets, and sequence testing circuit closing means connected to said magnets and all of said contact means for selectively controlling said electromagnets according to the sequential positions of the sensed records in said series.

18. In a machine of the class described; means to sense a plurality of records at a time, each recording having columns of index point positions, one or more of which positions may be made operative to express an element of a combination of elements denoting the sequential position of the record in a series or order, said sensing means including contact means, one for each position, rendered operative and inoperative by making the corresponding operating position operative; a plurality of machine control electromagnets; and sequence testing circuit closing means connected to said magnets and all of said contact means for selectively controlling said electromagnets selectively according to the sequential positions of the sensed records in said series, said sequence tecting circuit closing means having provision for closing a circuit to a predetermined one of said electromagnets when the sensed records are identically designated.

19. In a data comparing machine designed to be controlled by a plurality of opposed groups of record cards, the combination with receiving and distributing magazines including a common receiver, of analyzer units including reading means, means for feeding said cards individually from said opposed groups of cards to said analyzer units for reading, comparing means for comparing said readings from opposed cards, value differentiating selective means cooperating with said comparing means for selecting a card of a predetermined value extreme when the data in opposed records disagree, ejecting means controlled by said selective means for selectively ejecting any one of said cards, correlating means for bringing said selectively ejected cards together into a common receiver in sequential order, and alternate selective means for controlling the disposition of opposed cards when the data in said cards correspond.

20. In a machine controlled by records having columns of index-point positions, one or more of which positions may be made operative in each of several columns to designate the elements of a series or sequence which the records may follow; means to sense the operating positions of a plurality of said records at a time to determine which positions in each column of each record have been made operative; means for comparing the operative positions in the sensed records to determine their position in said series or sequence, including means to read out to the sensing means all the elements of a complete series for comparison with the operative positions, said readout commencing with a predetermined extreme of the sequence and terminating with a predetermined opposite extreme; and a plurality of selectable machine control elements selectively rendered effective when an operative position in one of said records denoting one of two extremes of sequence between said first namd extremes agrees with the readout by the comparing means, said control elements being selected according to which of the sensed records has a predetermined extreme.

21. In a machine controlled by records having columns of index-point positions one or more of which positions may be made operative in each several columns to designate the elements of a series or sequence, which the records may follow, means to sense the operating positions of a plurality of said records at a time to determine which positions in each column of each record have been made operative; means for comparing the operative positions in the sensed records to determine their relative position in said series or sequence, including means to read out to the sensing means all the elements of a complete series for comparison with the operative positions, said readout commencing with a predetermined extreme of the sequence and terminating with a predetermined opposite extreme; a plurality of selectable machine control elements selectively rendered effective when an operative position in one of said records denoting one of two extremes of sequence between said first named extremes agrees with the readout by the comparing means, said control elements being selected according to which of the sensed records has a predetermined extreme; and means for automatically selecting a predetermined one of said elements when a plurality of the sensed records compare alike.

22. In a machine controlled by records identified by designations placed in the index-point positions of columns devoted to designating the sequential position of a record in a series in which the records are arranged, each record having a plurality of columns each of which columns may contain one or more designations in part denoting the sequential position of the record; means to analyze together the designations in a plurality of records selected one from each of a plurality of opposed groups; means to read out to the analyzing means, for comparison with the designations in all of the records sensed, all of the elements involved in designating a complete series until the designations sensed at least one of the selected records match the elements read out, and a plurality of machine control means selected by the readout means according to which of the selected records matches the readout by the readout means.

23. In a machine controlled by records having columns of index-point positions, one or more of said columns in each record containing designations denoting the sequential position of the record in a series or order which the records may follow, such as a numerical or alphabetical series; a plurality of record sensing devices each for sensing the designations on one of a plurality of opposed groups of such records; means associated with each sensing means for reading out to said sensing means, for comparison with the designations in the record sensed, a complete series of sequential position designating elements until one of said read-out elements matches the designations on a record sensed by the associated sensing means; and selectable machine control elements, one for each sensing means, selectively rendered operative by the readout means according to which one of the sensed records matches the readout by the readout means.

24. A data comparing machine for records of the character described comprising a plurality of distributing magazines for receiving opposed groups of records, a common receiving magazine, means for consecutively sensing records in the opposed groups of records, means controlled by said sensing means for partially establishing an electric circuit corresponding to each ordinal in each opposed record designation being sensed, means to energize all of said partially established circuits, means controlled by at least one of said energized circuits to select a record having a value nearest a predetermined value extreme, and ejecting means controlled by said selective means for selectively ejecting said records in a predetermined order.

25. In a machine controlled by records having columns of index-point positions, one or more of which columns contains designations which denote the sequential positions of the records in a series or order followed by the records; means to sense successively the records in a plurality of opposed groups including contact means closed in response to the designations in each sensed record; readout means including commutators, at least one commutator for each record group and arranged to progressively close circuits to the contact means representative of different possible designations identifying the members of said series; and a plurality of machine control magnets, one for each commutator, said magnets being selectively energized according to which of a plurality of sensed records agrees in designations with circuits closed by said commutators through said contact means.

26. A record-controlled electrical apparatus for selectively determining the comparative numerical value of numbers in a plurality of record fields, comprising a normally ineffective circuit for each possible digit position and value of each field, means for partially conditioning a circuit corresponding to each actual digit in each field, means for serially completely conditioning each circuit in accordance with the relative value of each digit in each field, record handling mechanism, and means whereby said mechanism is controlled by said serial conditioning to select a field of a predetermined value sequence.

27. In a machine controlled by records having columns of index-point positions, one or more of which columns contains designations which denote the sequential positions of the records in a series or order followed by the records; means to sense successively the records in a plurality of opposed groups including contact means closed in response to the designations in each sensed record; readout means including commutators, at least one commutator for each record group and arranged to progressively close circuits to the contact means representative of different possible designations identifying members of said series; and a plurality of machine control magnets, one for each commutator, said magnets being selectively energized according to which of a plurality of sensed records agrees in designations with circuits closed by said commutators through said contact means, said magnets being opposed so as to be ineffectual when all the sensed records are designated alike, one of said commutators having a connection to a predetermined magnet closed after the readout is terminated to energize the predetermined magnet whereby to preferentially dispose of one of a plurality of identically designated records.

28. In a machine controlled by records having columns of index-point positions, one or more of which columns contains designations which denote the sequential positions of the records in a series or order followed by the records; means to analyze successively the records in a plurality of opposed groups, including contact means closed in response to the designations in each analyzed record; readout means including commutators, at least one commutator for each record group and arranged to close circuits to the contact means representative of different possible designations identifying members of said series; a plurality of machine control magnets, at least one for each commutator, said magnets being selectively energized according to which of a plurality of analyzed records agrees in designations with the circuits closed by said commutators through said contact means; and auxiliary circuit closing means for closing a circuit to a predetermined one of said magnets after the readout to the analyzing means is terminated.

29. In a machine controlled by records having columns of index-point positions, one or more of which columns contains designations which denote the sequential positions of the records in a series or order followed by the records; means to analyze successively the records in a plurality of opposed groups including contact means closed in response to the designations in each analyzed record; readout means including commutators, at least one commutator for each record group and arranged to close circuits to the contact means representative of different possible designations identifying members of said series; and record ejecting means including a plurality of ejection control magnets, one for each commutator, said magnets being selectively energized according to which a plurality of analyzed records agrees in designations with the circuits closed by said commutators through said contact means whereby to eject said records in said sequential order.

30. In a data comparing machine, the combination with a common receiver of a plurality of reading means, each constructed and arranged to be conditioned by the data readings in one of a plurality of opposed records, value differentiating selective means constructed and arranged to be actuated by any of said plurality of said conditioned reading means, and to select from said plurality of opposed records undergoing comparison any one of said records bearing data of a predetermined value extreme, and correlating means, including record handling mechanism for ejecting opposed records to the common receiver and controlled by said selective means, said mechanisms being co-ordinated and disposed in relation to each other and to said reading and selective means to bring said selected records together in a common group in the order selected, when the data in the records disagree, and alternate selective means for controlling the disposition of said records when the data in said records correspond.

31. In a machine controlled by records having columns of index-point positions one or more of which columns contains designations which denote the sequential positions of the records in a series or order followed by the records; means to sense successively the records in a plurality of opposed groups including contact means closed in response to the designations in each sensed record; readout means including commutators, at least one commutator for each record group and arranged to progressively close circuits to the contact means representative of different possible designations identifying members of said series; and record ejecting means including a plurality of ejection control magnets, one for each commutator, said magnets being selectively energized according to which of a plurality of sensed records agrees in designations with the circuits closed by said commutators through said contact means whereby to eject said sensed records in said sequential order, said magnets being opposed so as to be ineffectual when a plurality of the sensed records are designated alike, one of said commutators having a connection to a predetermined one of said magnets to energize said one magnet and thereby cause one of two identically designated records to be ejected in advance of the other.

32. In a data comparing machine designed to be controlled by data designations in opposed groups of records for the purpose of selectively regrouping said records, the combination of reading means constructed and arranged to be conditioned by the data readings in a plurality of opposed records undergoing comparison, comparing means constructed and arranged to be actuated by said conditioned means, value differentiating selective means associated with said comparing means for selecting from the opposed records under comparison any one bearing a value designation of a predetermined value extreme, record handling mechanism controlled by said selective means for bringing said records together in a common group when the data in said records disagree and alternate selective means for controlling the grouping of said records when the data in the records correspond.

33. A continuously operative data comparing machine for correlating record cards, comprising a plurality of card distributing magazines, a common receiver; a plurality of card-feed mechanisms, each operable to feed cards one by one from a related distributing magazine to the common receiver; means for reading a number from each card fed, comparing mechanism operable to compare the numbers read from the cards fed from one magazine with the cards fed from the other magazine and to cause the card-feed mechanisms to be operative or inoperative selectively in accordance with the relative size of the numbers compared, and means controlled by comparing means to select a predetermined one of said card feed mechanisms when the compared numbers correspond.

34. A data comparing machine for correlating record cards, comprising two card distributing magazines, a common receiver, two card-feed mechanisms each operable to feed cards one at a time from a separate related card distributing magazine to the common receiver, two card reading devices each operable to read a number from the card fed from a separate related distributing magazine, and comprising mechanism operable to compare the two numbers read from the cards by the card reading devices to determine which number is the higher and, as a result of said determination, selectively to cause either one of said card-feed mechanisms to operate alone to feed the card having the lower number to the common receiver, said comparing mechanism including separate means to cause the ejection of corresponding records of one magazine to the common receiver before ejecting the corresponding cards from the other magazine.

35. Apparatus for filing control cards which cards have operating positions representing serial designations, certain of said positions being made operative to correspond with the designations of a record, and which cards are separated into two groups, the cards of one group being complemental in serial designations with respect to the cards in the other group, with the cards of each group arranged in serial order, said apparatus comprising a common receiver, means for withdrawing cards from each group including selectable means for ejecting the withdrawn cards into the common receiver, means for comparing operating positions of corresponding value in the withdrawn cards; and value differentiating selective means cooperating with said comparing means for controlling the selectable means to eject into a common receiver the particular one of said compared cards having the lower designated value in a manner to form a single group in designation sequence, said value differentiating means having means to selectively control the selectable means to cause one of two cards which correspond in designations to be ejected into the common receiver ahead of the other corresponding card.

36. In a machine for operating upon a plurality of groups of records, each record having operating positions made operative to represent a sequential position in a series in which the plurality of groups are to be fed in a single sequence; means to withdraw for comparison a record from each group and eject the compared records to a common path, means to sense the operating positions of the withdrawn records to detect the positions made operative, a plurality of selectable devices for controlling the withdrawing means to select the record to be withdrawn and causing the subsequent ejection of the records to said common path, means controlled by the sensing means for comparing the operative positions of the withdrawn records and including a member movable to select one of the selectable devices according to the relative sequential position of the withdrawn records to cause said records to be ejected to said path in the desired sequence, and means whereby said member selects a predetermined one of the selectable devices when the operative operating positions of the compared records correspond to thereby cause the ejection of all corresponding records from one group ahead of the remaining corresponding records of another group.

37. Apparatus for filing control cards which cards have operating positions representing serial designations, certain of said positions being made operative to correspond with the designations of a record, and which cards are separated into two groups, certain of the cards of each group being complemental in serial designation with respect to all of the cards in the other group, with the cards of each group arranged in serial order, said apparatus comprising a common receiver, means for automatically withdrawing cards from each group in ascending sequence, means for comparing operating positions of corresponding value in the withdrawn cards, said comparing means having opposed members each conditionable by said operative positions in one of said withdrawn cards, each of said comparing members being so disposed in relation to said operative positions in the cards of said groups as to be conditionable by cards having serial designations higher in value than the serial designations by which said opposed comparing member is contemporaneously conditioned, value differentiating selective means cooperating with said comparing means for selectively ejecting into a common receiver the particular one of said compared cards having the lower designated value in a manner to form, of such selected cards, a single group in designation sequence, and alternate selective means for controlling the disposition of said cards when the serial designations in the compared cards are of corresponding value.

38. Apparatus for filing control cards which have operating positions representing serial designations, certain of said positions being made operative to correspond with the designations of a record, and which cards are separated into two groups, all of the cards of one group being complemental in serial designations with respect to the cards in the other group, with the cards of each group arranged in serial order; comprising a common receiver, means for automatically withdrawing cards from each group; means for comparing operating positions of corresponding value in the withdrawn cards, said comparing means having opposed members each conditionable by said operative positions in one of said withdrawn cards, said members being so disposed in relation to said operative positions in the cards of said groups, and in the said withdrawn cards, as to present for value differentiation opposed members conditioned to represent serial designations by which either of said members may subsequently be conditioned by the cards in said groups of cards; value differentiating selective means cooperating with said comparing means for controlling the withdrawing means to eject into a common receiver the particular one of said compared cards having the lower designated value in a manner whereby to form, of the two original groups, a single group in designation sequence; and supplemental means operative, when two compared cards are designated alike in all compared operating positions, to select a particular one of the withdrawing means to cause ejection of one of the compared cards in advance of the other.

39. Apparatus for filing control cards, which cards have operating positions representing serial designations, certain of said positions being made operative to correspond with the designations of a record, and which cards are separated into two groups, the cards of one group being complemental in serial designations with respect to the cards in the other group, with the cards of each group arranged in serial order; comprising a common receiver, means for withdrawing cards from each group; a pair of electrical sensing devices, each for sensing data designations in one of a pair of withdrawn cards; electrical circuit connections partially established under control of said sensing devices; means for comparing operating positions of corresponding value in the withdrawn cards, said comparing means including said circuit connections and means for completing said partially established circuit connections; value differentiating selective means cooperating with said comparing means for controlling the ejecting into said common receiver of the particular one of said compared cards having the lower designated value in a manner to form a single group in designation sequence, and a supplemental circuit to the value differentiating means closed by the circuit closing means when a pair of sensed records is identically designated and causing one of the identically designated records to be ejected before the other identically designated record.

40. A machine for collating records according to sequence of data represented on said records by index points, comprising means for feeding records singly from each of two stacks of records, record sensing means for sensing the data representations on the records from each of said two stacks, means controlled by the sensing means for comparing the data representations on the records fed from the separate stacks, means controlled in accordance with the sensed data representations for causing feeding of the record bearing the lower data designation to a receiving station, and means operative when the data designations on two records from the different stacks agree to cause feeding of the record from a predetermined one of said stacks to said receiving station prior to the feeding of the record from the other of said stacks to said receiving station.

41. A machine adapted for control by records in which alphabetical indicia is represented by combinations of designations disposed in columns of index point positions, means controlled by the alphabetic designations in a plurality of records for inserting said indicia in the machine, means for feeding two sets of said records including a plurality of feed controlling elements representing the different possible relative sequential positions of the indicia on the record fed, and means controlled by the first named means for selecting one of the feed controlling elements to feed first the one of the compared records which is lowest in alphabetic sequence and to select another of said elements when the opposite alphabetic sequential relationship is present.

42. In a machine controlled by records having designations representing the elements of sequence indicia, such as numbers, arranged in a plurality of separate sets with the records of each set in the same predetermined sequence; means to sense the designations, means to feed a record of each set to the sensing means, a read-out device arranged to be advanced step-by-step in the same sequence as the records are fed to the sensing means and reading out a complete sequence for comparison with the records sensed, and means jointly controlled by the read-out means and sensing means to cause the feeding of a record from either set which agrees with the readout device whereby to feed the records from said sets in the sequence determined by the readout device.

43. In a machine controlled by records identified by numbers represented by designations in the records, said records being arranged in a plurality of separate groups, each group following a common sequence; means to sense the designations, means to feed a record from each group to the sensing means, readout means including a counter actuated to successively represent all of the numbers of said common sequence, and means to cause the feeding means to operate to feed a record having designations corresponding to the number read out by the counter.

44. In a machine of the class described, means to feed two sets of records each record having designations representing one of the numbers of a complete sequence, means to selectively control the feeding mechanism to cause one or the other of the feeding mechanisms to operate, means to sense the designations on a record from each of said sets; and readout means advanced progressively to read out in succession all the members of said sequence one at a time for comparison with the designations in the sensed records, said readout means controlling the second-named means to cause the sensed records to be fed in a single sequence.

45. In a machine controlled by records having designations representing the elements of sequence indicia, such as numbers, arranged in a plurality of separate sets with the records of each set in the same predetermined sequence; electrical sensing means for closing circuits according to the sequential value of the designations sensed, means to feed a record of each set to the sensing means including magnets for selecting the set of records to be fed; and a readout device arranged to be advanced step-by-step in the same sequence as the records are fed to the sensing means and including means to progressively close circuits representative of all of the numbers of the predetermined sequence for comparison with the circuits closed by the sensing means, said circuit closing means cooperating to close a circuit to select one or the other of said magnets when a sensed record agrees in designations with the readout by the readout means.

46. In a machine controlled by records having designations representing the numbers of a series or sequence according to which the records are to be arranged, said records being divided into a plurality of separate groups, the records of each group being designated with some of the numbers of said series and arranged in the same sequence; means to sense the designations on the records, separate means for feeding to said sensing means a record from each group, readout means including a counting device constructed to successively read out all of the numbers of said series between the limits of the first and last sensed records, means to compare the designations of each record sensed with successive readouts until an agreement is detected, a common receiving receptacle for said records, and means controlled by the comparing means selectively controlling the feeding means to cause the records which agree with the readouts to be fed to said receptacle in the order of said series.

47. In a machine controlled by records having designations representing the numbers of a series or sequence according to which the records are to be arranged, said records being divided into a plurality of separate groups, the records of each group being designated with some of the numbers of said series and arranged in the same sequence; a plurality of record sensing stations, one for each group, and having elements responsive to said designations; means whereby said elements close circuits according to the values of the designations, an electrical readout device including counting means advanced step-by-step to successively indicate all of the numbers of a complete series of numbers having circuit closing means for closing circuits representative of the numbers indicated, a common receptacle, and means to feed the records from the sensing stations to said receptacle including a feed controlling magnet for each station for causing the feeding of a record from the corresponding station to the common receptacle, said magnets being in circuit with the circuit closing means and selectively energized according to which of said stations has a record agreeing in number with the number indicated by the counting means.

48. A data comparing machine designed to be controlled by the comparison of data perforations in the ordinal columns of the designating fields of a plurality of opposed separate records; comprising a plurality of record analyzing elements constructed and arranged to be conditioned by the data readings in the opposed separate records, a common receiver in which the opposed sets of records are to be deposited in a single sequence; comparing means, including selection determining means so disposed in relation to said reading elements and said comparing means as to be controlled by the comparison of said conditioned elements corresponding to any of the opposed columns in the designating fields of the opposed records, irrespective of the condition of reading elements corresponding to those columns of a designating field not required for a data record; a plurality of record handling mechanisms associated with said selection determining means for feeding all of the compared records to the common receiver, said mechanism being constructed and arranged to selectively feed the separate records to the common receiver or withhold said records in response to said determining means; and separate means to select a predetermined record handling mechanism to feed to the common receiver one of two compared records which correspond in the compared fields whereby said one record always precedes the other record in sequence in said receiver.

IRENE B. WHETSTONE.

Certificate of Correction

Patent No. 2,411,645.

November 26, 1946.

IRENE B. WHETSTONE

It is hereby certified that errors appear in the printed specification of the above numbered patent requiring correction as follows: Column 36, line 2, claim 22, after "sensed" insert on; column 37, line 65, claim 29, after "which" insert of; column 39, line 14, claim 34, for "comprising" read *comparing*; and that the said Letters Patent should be read with these corrections therein that the same may conform to the record of the case in the Patent Office.

Signed and sealed this 18th day of February, A. D. 1947.

[SEAL]

LESLIE FRAZER,
*First Assistant Commissioner of Patents.* or sequence according to which the records are to be arranged, said records being divided into a plurality of separate groups, the records of each group being designated with some of the numbers of said series and arranged in the same sequence; a plurality of record sensing stations, one for each group, and having elements responsive to said designations; means whereby said elements close circuits according to the values of the designations, an electrical readout device including counting means advanced step-by-step to successively indicate all of the numbers of a complete series of numbers having circuit closing means for closing circuits representative of the numbers indicated, a common receptacle, and means to feed the records from the sensing stations to said receptacle including a feed controlling magnet for each station for causing the feeding of a record from the corresponding station to the common receptacle, said magnets being in circuit with the circuit closing means and selectively energized according to which of said stations has a record agreeing in number with the number indicated by the counting means.

48. A data comparing machine designed to be controlled by the comparison of data perforations in the ordinal columns of the designating fields of a plurality of opposed separate records; comprising a plurality of record analyzing elements constructed and arranged to be conditioned by the data readings in the opposed separate records, a common receiver in which the opposed sets of records are to be deposited in a single sequence; comparing means, including selection determining means so disposed in relation to said reading elements and said comparing means as to be controlled by the comparison of said conditioned elements corresponding to any of the opposed columns in the designating fields of the opposed records, irrespective of the condition of reading elements corresponding to those columns of a designating field not required for a data record; a plurality of record handling mechanisms associated with said selection determining means for feeding all of the compared records to the common receiver, said mechanism being constructed and arranged to selectively feed the separate records to the common receiver or withhold said records in response to said determining means; and separate means to select a predetermined record handling mechanism to feed to the common receiver one of two compared records which correspond in the compared fields whereby said one record always precedes the other record in sequence in said receiver.

IRENE B. WHETSTONE.

Certificate of Correction

Patent No. 2,411,645. November 26, 1946.

IRENE B. WHETSTONE

It is hereby certified that errors appear in the printed specification of the above numbered patent requiring correction as follows: Column 36, line 2, claim 22, after "sensed" insert *on*; column 37, line 65, claim 29, after "which" insert *of*; column 39, line 14, claim 34, for "comprising" read *comparing*; and that the said Letters Patent should be read with these corrections therein that the same may conform to the record of the case in the Patent Office.

Signed and sealed this 18th day of February, A. D. 1947.

[SEAL]

LESLIE FRAZER,
*First Assistant Commissioner of Patents.*